May 26, 1959 C. M. GRINAGE 2,887,906

HORIZONTAL BORING MILL

Filed Sept. 24, 1954 22 Sheets-Sheet 1

*INVENTOR.*
CLAUDE M. GRINAGE
*BY* Paul M. Gist
ATTORNEY

May 26, 1959

C. M. GRINAGE 2,887,906

HORIZONTAL BORING MILL

Filed Sept. 24, 1954

22 Sheets-Sheet 2

INVENTOR.
CLAUDE M. GRINAGE
BY Paul M. Rist
ATTORNEY

May 26, 1959 C. M. GRINAGE 2,887,906

HORIZONTAL BORING MILL

Filed Sept. 24, 1954 22 Sheets-Sheet 3

*INVENTOR.*
CLAUDE M. GRINAGE
*BY* Paul M. Grist
ATTORNEY

May 26, 1959 C. M. GRINAGE 2,887,906

HORIZONTAL BORING MILL

Filed Sept. 24, 1954

22 Sheets-Sheet 4

*INVENTOR.*

CLAUDE M. GRINAGE

*BY* Paul M. Craig [signature]

ATTORNEY

May 26, 1959 C. M. GRINAGE 2,887,906

HORIZONTAL BORING MILL

Filed Sept. 24, 1954 22 Sheets-Sheet 5

INVENTOR.
CLAUDE M. GRINAGE

BY Paul M. Geist
ATTORNEY

May 26, 1959

C. M. GRINAGE 2,887,906

HORIZONTAL BORING MILL

Filed Sept. 24, 1954

22 Sheets-Sheet 6

*INVENTOR.*
CLAUDE M. GRINAGE

*BY* Paul M. Frist
ATTORNEY

May 26, 1959 C. M. GRINAGE 2,887,906

HORIZONTAL BORING MILL

Filed Sept. 24, 1954 22 Sheets-Sheet 7

INVENTOR.
CLAUDE M. GRINAGE

BY Paul M. Fist

ATTORNEY

May 26, 1959 C. M. GRINAGE 2,887,906

HORIZONTAL BORING MILL

Filed Sept. 24, 1954

22 Sheets-Sheet 8

INVENTOR.
CLAUDE M. GRINAGE
BY
ATTORNEY

May 26, 1959 C. M. GRINAGE 2,887,906

HORIZONTAL BORING MILL

Filed Sept. 24, 1954 22 Sheets-Sheet 9

INVENTOR.
CLAUDE M. GRINAGE
BY Paul M. Geist
ATTORNEY

May 26, 1959 C. M. GRINAGE 2,887,906

HORIZONTAL BORING MILL

Filed Sept. 24, 1954 22 Sheets-Sheet 10

*INVENTOR.*
CLAUDE M. GRINAGE
*BY* Paul M. Feist
ATTORNEY

May 26, 1959 C. M. GRINAGE 2,887,906

HORIZONTAL BORING MILL

Filed Sept. 24, 1954 22 Sheets-Sheet 11

INVENTOR.
CLAUDE M. GRINAGE

BY Paul M. Gist

ATTORNEY

INVENTOR.
CLAUDE M. GRINAGE
BY Paul M. Frist
ATTORNEY

May 26, 1959 C. M. GRINAGE 2,887,906

HORIZONTAL BORING MILL

Filed Sept. 24, 1954 22 Sheets-Sheet 13

INVENTOR.
CLAUDE M. GRINAGE
BY Paul M. Gist
ATTORNEY

May 26, 1959 C. M. GRINAGE 2,887,906

HORIZONTAL BORING MILL

Filed Sept. 24, 1954 22 Sheets-Sheet 14

INVENTOR.
CLAUDE M. GRINAGE
BY Paul M. Geist
ATTORNEY

INVENTOR.
CLAUDE M. GRINAGE
BY Paul M. Geist
ATTORNEY

INVENTOR.
CLAUDE M. GRINAGE
BY Paul M. Geist
ATTORNEY

HORIZONTAL BORING MILL

Filed Sept. 24, 1954 22 Sheets-Sheet 17

*INVENTOR.*
CLAUDE M. GRINAGE
*BY*
Paul M. Rist
ATTORNEY

May 26, 1959 C. M. GRINAGE 2,887,906

HORIZONTAL BORING MILL

Filed Sept. 24, 1954 22 Sheets-Sheet 18

*INVENTOR.*
CLAUDE M. GRINAGE

*BY* Paul M. Geist
ATTORNEY

May 26, 1959 C. M. GRINAGE 2,887,906

HORIZONTAL BORING MILL

Filed Sept. 24, 1954 22 Sheets-Sheet 19

INVENTOR.
CLAUDE M. GRINAGE
BY Paul M. Frait
ATTORNEY

May 26, 1959 C. M. GRINAGE 2,887,906

HORIZONTAL BORING MILL

Filed Sept. 24, 1954 22 Sheets-Sheet 20

*INVENTOR.*
CLAUDE M. GRINAGE

*BY* Paul M. Geist
ATTORNEY

May 26, 1959 C. M. GRINAGE 2,887,906

HORIZONTAL BORING MILL

Filed Sept. 24, 1954 22 Sheets-Sheet 21

*INVENTOR.*
CLAUDE M. GRINAGE

*BY* Paul M. Feist
ATTORNEY

May 26, 1959 C. M. GRINAGE 2,887,906
HORIZONTAL BORING MILL
Filed Sept. 24, 1954 22 Sheets-Sheet 22

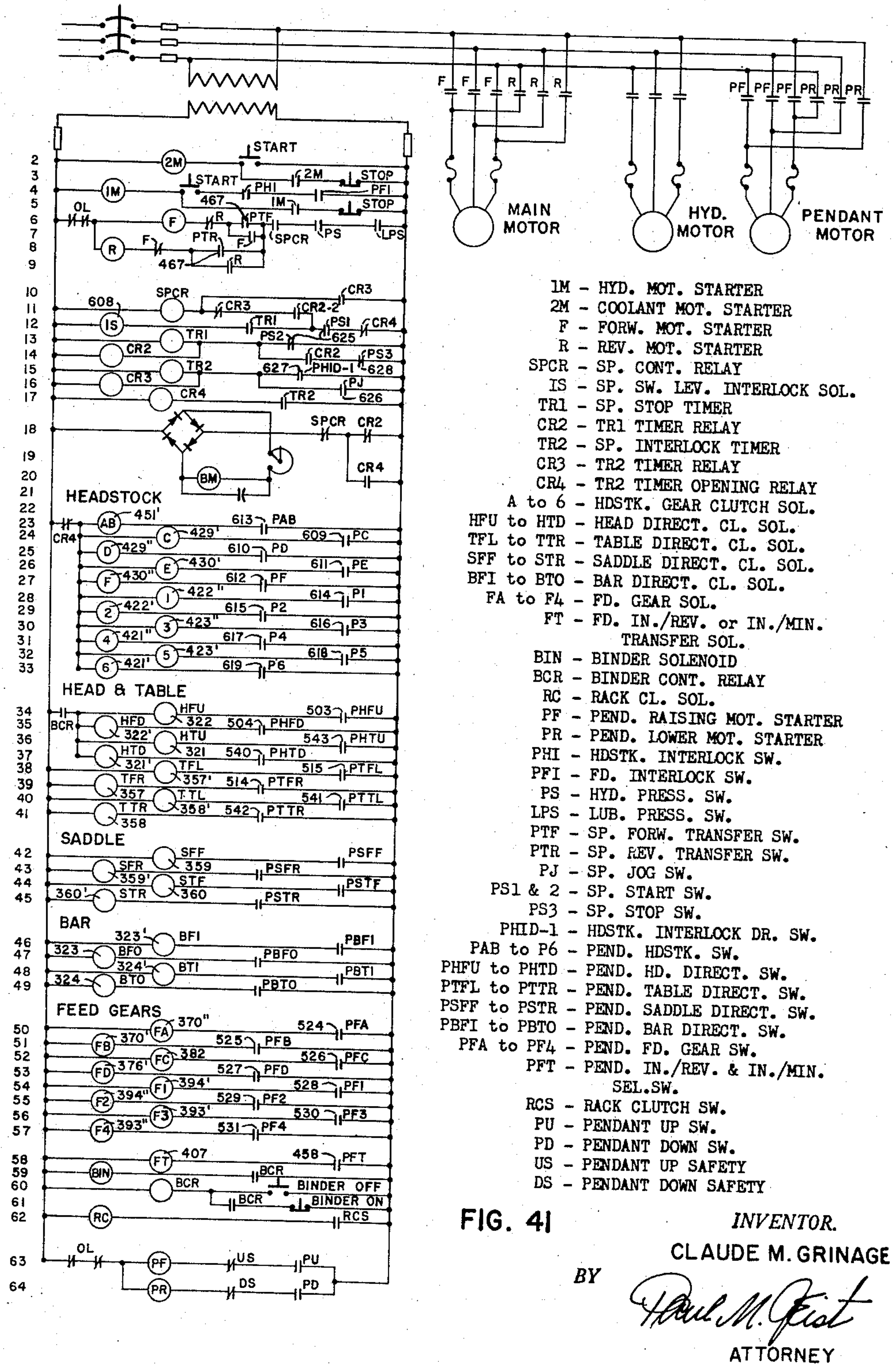

FIG. 41

1M - HYD. MOT. STARTER
2M - COOLANT MOT. STARTER
F - FORW. MOT. STARTER
R - REV. MOT. STARTER
SPCR - SP. CONT. RELAY
IS - SP. SW. LEV. INTERLOCK SOL.
TR1 - SP. STOP TIMER
CR2 - TR1 TIMER RELAY
TR2 - SP. INTERLOCK TIMER
CR3 - TR2 TIMER RELAY
CR4 - TR2 TIMER OPENING RELAY
A to 6 - HDSTK. GEAR CLUTCH SOL.
HFU to HTD - HEAD DIRECT. CL. SOL.
TFL to TTR - TABLE DIRECT. CL. SOL.
SFF to STR - SADDLE DIRECT. CL. SOL.
BFI to BTO - BAR DIRECT. CL. SOL.
FA to F4 - FD. GEAR SOL.
FT - FD. IN./REV. or IN./MIN. TRANSFER SOL.
BIN - BINDER SOLENOID
BCR - BINDER CONT. RELAY
RC - RACK CL. SOL.
PF - PEND. RAISING MOT. STARTER
PR - PEND. LOWER MOT. STARTER
PHI - HDSTK. INTERLOCK SW.
PFI - FD. INTERLOCK SW.
PS - HYD. PRESS. SW.
LPS - LUB. PRESS. SW.
PTF - SP. FORW. TRANSFER SW.
PTR - SP. REV. TRANSFER SW.
PJ - SP. JOG SW.
PS1 & 2 - SP. START SW.
PS3 - SP. STOP SW.
PHID-1 - HDSTK. INTERLOCK DR. SW.
PAB to P6 - PEND. HDSTK. SW.
PHFU to PHTD - PEND. HD. DIRECT. SW.
PTFL to PTTR - PEND. TABLE DIRECT. SW.
PSFF to PSTR - PEND. SADDLE DIRECT. SW.
PBFI to PBTO - PEND. BAR DIRECT. SW.
PFA to PF4 - PEND. FD. GEAR SW.
PFT - PEND. IN./REV. & IN./MIN. SEL. SW.
RCS - RACK CLUTCH SW.
PU - PENDANT UP SW.
PD - PENDANT DOWN SW.
US - PENDANT UP SAFETY
DS - PENDANT DOWN SAFETY

*INVENTOR.*
CLAUDE M. GRINAGE
*BY* Paul M. Feist
ATTORNEY 2,887,906

HORIZONTAL BORING MILL

Claude M. Grinage, Stratford, Conn., assignor to The Bullard Company, a corporation of Connecticut Application September 24, 1954, Serial No. 458,110

42 Claims. (Cl. 77—3)

This invention relates to machine tools and particularly to a new and improved horizontal boring mill, and a control therefor.

The principal object of this invention is to provide a horizontal boring mill requiring a minimum of mental and physical exertion to operate it.

Other objects include the provision of a horizontal boring mill having interchangeable unit assemblies so that a maximum number of common unit assemblies and a minimum number of special parts are required to produce a large number of the same type of horizontal boring mills having different work capacities; the provision of a horizontal boring mill of the type including a vertically-disposed column along which a spindle head is adapted to be reciprocated, and in which a combined headstock and feedworks is mounted within the column; the provision of such a horizontal boring mill in which the headstock within the column on which the head reciprocates provides 24 different speeds, that cooperate with a high and a low gear arrangement in the head; the provision of such a horizontal boring mill in which the feedworks within the column is provided with four output shafts, each of which can be rotated at traverse or 16 different feed rates, as well as be rotated in a manner to provide a feed in inches per revolution of the spindle, or a feed in inches per minute; the provision of such a horizontal boring mill including a combined headstock and feedworks within the vertical column, and a removable bracket which supports electro-hydraulic units for actuating all of the clutches in the combined headstock and feedworks; the provision of such a horizontal boring mill in which a pendant is provided that contains an interlocking control for effecting the actuation of all of the electro-hydraulic units of the machine; and the provision of such a horizontal boring mill in which every one of its functions can be effected by a control mounted within a pendant conveniently located relatively to the work support of the machine.

The above, other objects and novel features of the invention will become apparent from the following specification and the accompanying drawings, in which:

Fig. 41 is a wiring diagram for the machine shown in Fig. 1.

Referring to Figs. 1 to 4 inclusive, the principles of the invention are shown as applied to a horizontal boring mill including a base B on the one end of which is mounted a column C and at the opposite end of which is mounted a rear post P'. A head H is mounted on the column C for vertical movement, and it includes a spindle S' adapted to be rotated at any one of a large number of speeds as well as to be moved axially outwardly toward the rear post P' and inwardly within the head H. Between the column C and the rear post P', the bed B is provided with ways on which is mounted a saddle S for longitudinal movement along the bed B rearwardly toward the post P' and forwardly toward the column C. The saddle S is provided with ways on it at right angles to those of the bed B, and a work-supporting table T is adapted to be reciprocated along the ways of the saddle S, rightwardly toward the column C and leftwardly away from said column.

Figure 4:
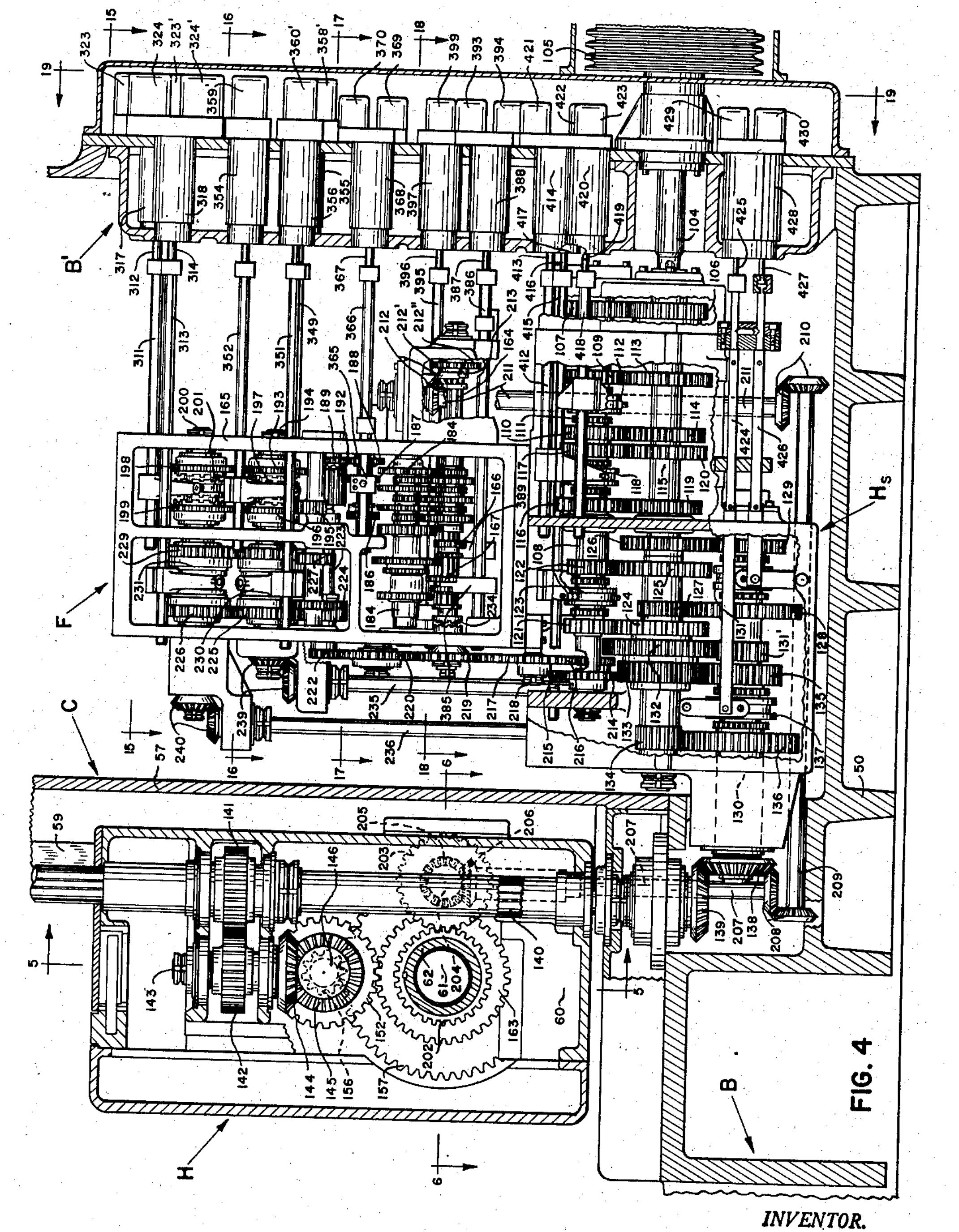
Fig. 4 is a sectional elevational view taken substantially along line 4—4 of Fig. 3.

Referring to Fig. 4, a combined headstock $H_s$ and feedworks F is mounted within the column C. It comprises the transmission for effecting the various movements of the movable members of the machine tool, including movement of the head H, the head of rear post P', the saddle S and the work-supporting table T; as well as for effecting the numerous rotative speeds and axial feeds of the spindle S'. A bracket B' (Fig. 4) is mounted at the rear of the column C and supports a plurality of hydraulically-actuated piston mechanisms and corresponding solenoid-operated valves therefor, adapted to effect the operation of the combined headstock and feedworks transmissions $H_s$ and F.

A pendant P mounted in cooperating position relatively to the work-supporting table T is provided with a plurality of interlocked switching devices which control the operation of all the solenoids within the bracket B' to thereby make it possible for an operator to cause the horizontal boring mill to perform any and every function of which it is capable directly from the pendant P.

Figure 1:
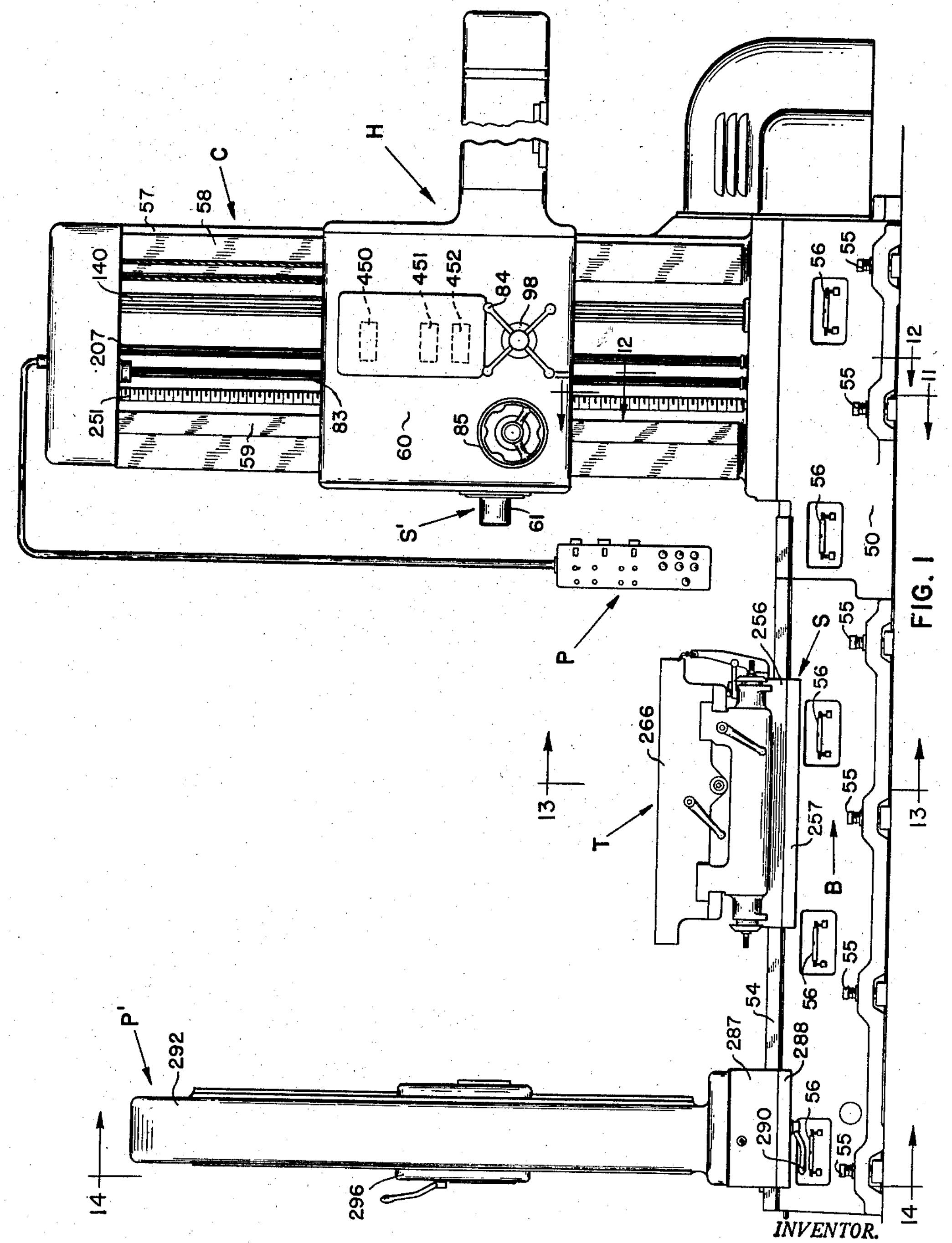
Figure 1 is a front elevational view of a horizontal boring mill to which the principles of the invention have been applied.
Figure 2:
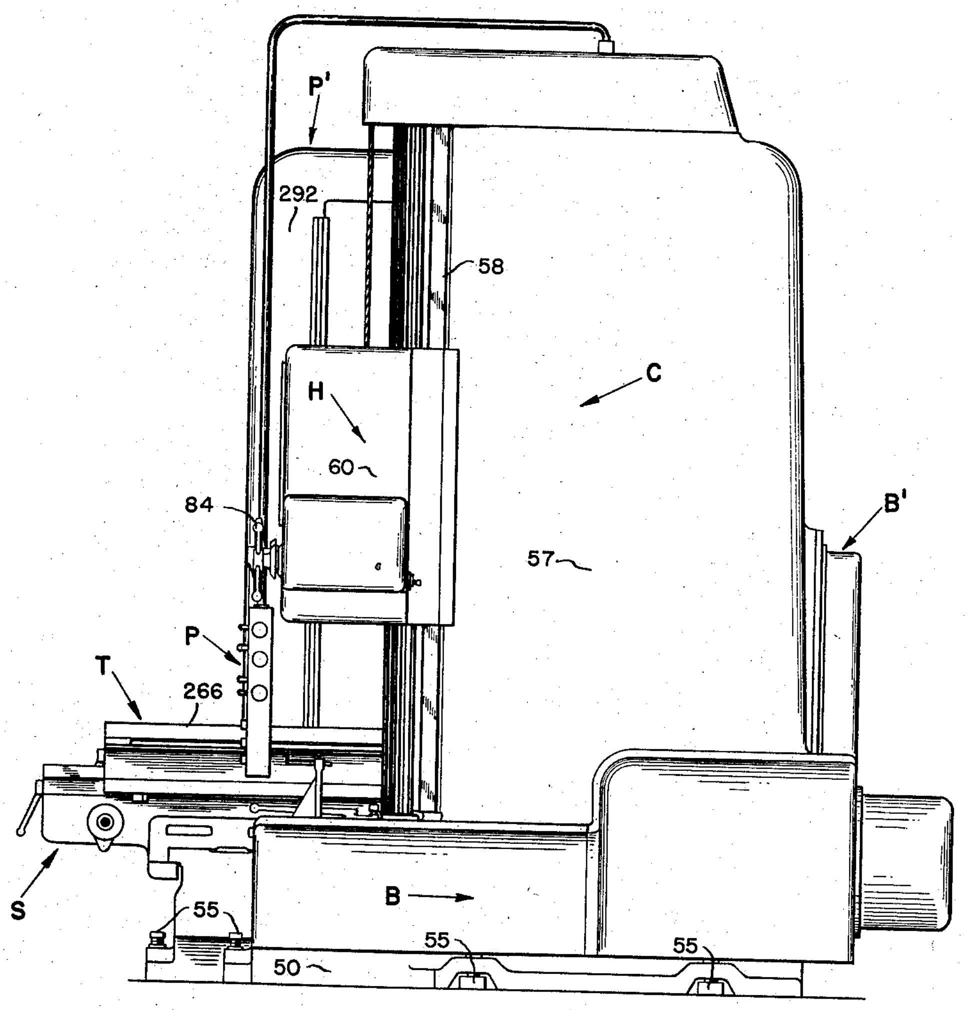
Fig. 2 is a right-end elevational view of the horizontal boring mill shown in Fig. 1.
Figure 3:
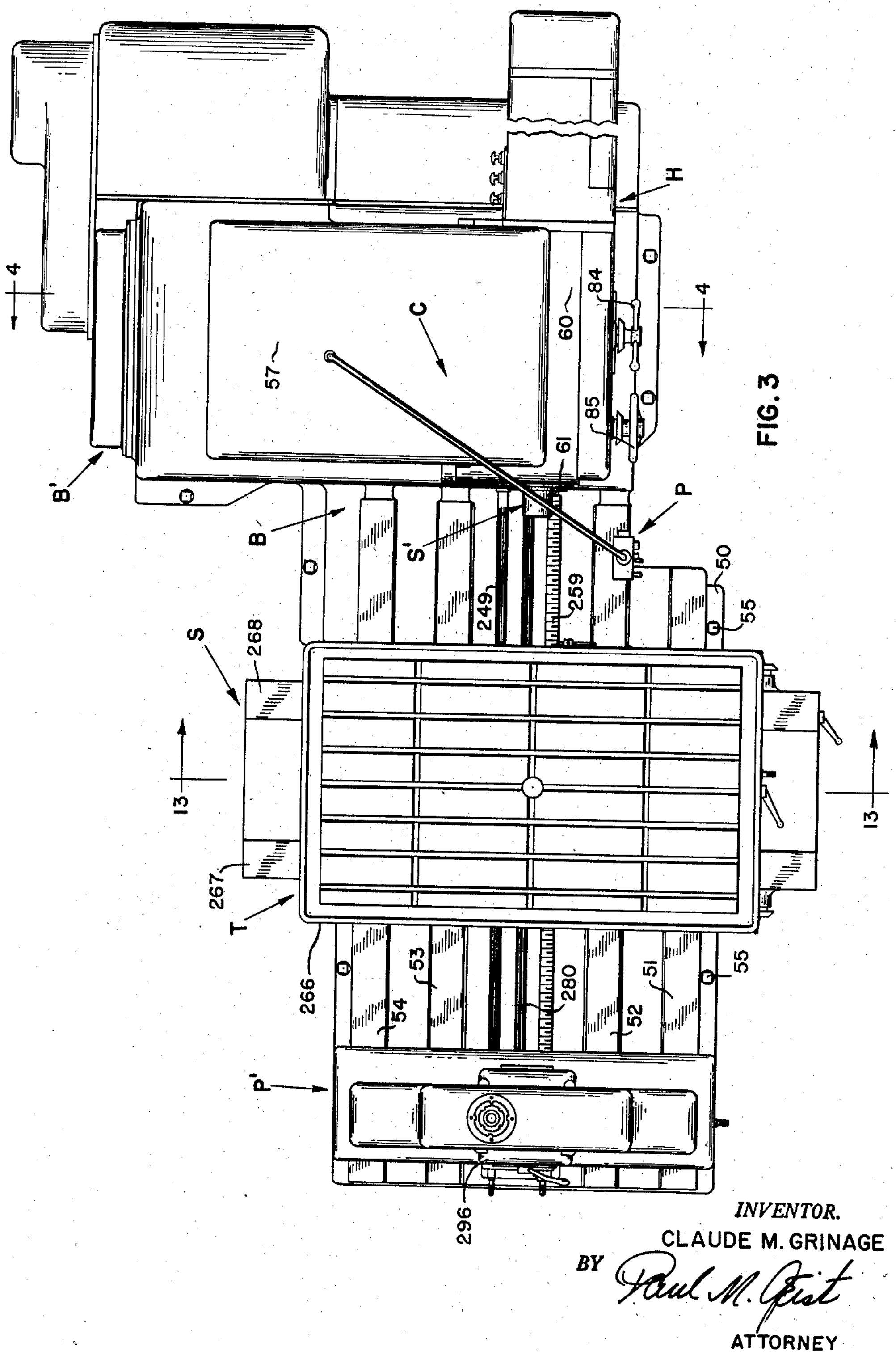
Fig. 3 is a top plan view of the horizontal boring mill shown in Fig. 1.
Figure 13:
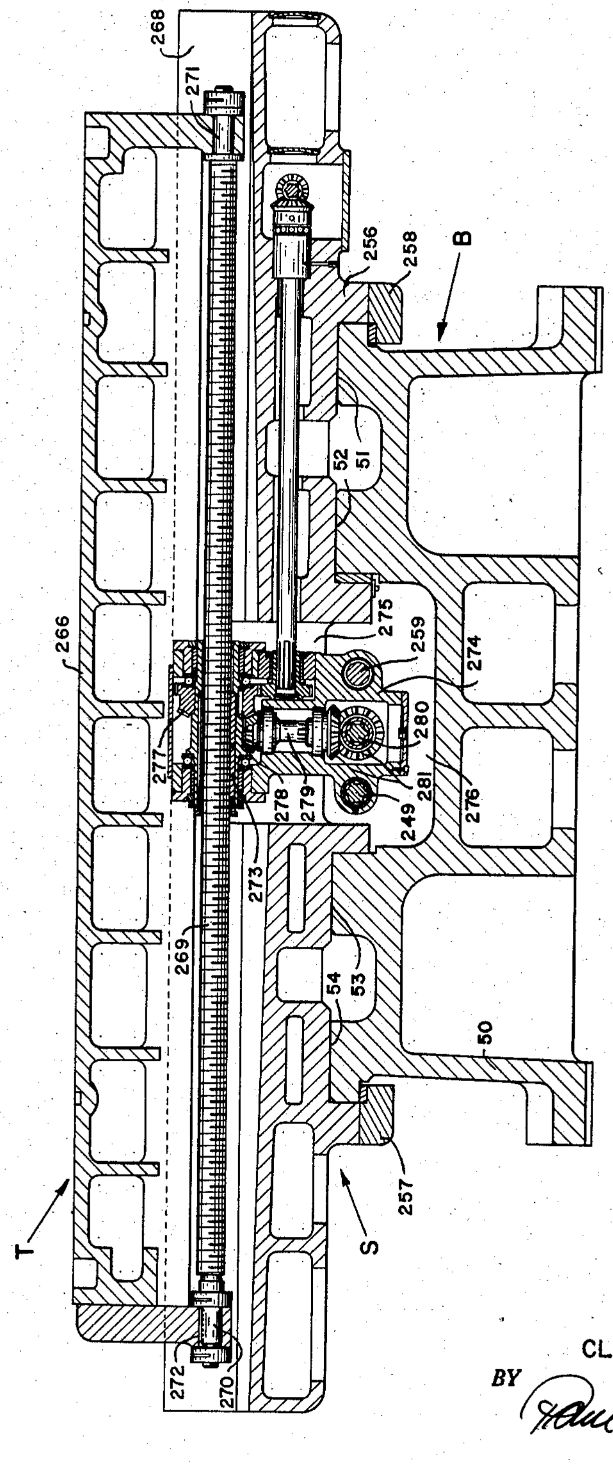
Fig. 13 is a sectional elevational view taken substantially along line 13—13 of Figs. 1 and 3.

Referring to Figs. 1, 3 and 13, the base B comprises an elongated casting 50 of generally rectangular cross section, suitably ribbed to provide a rigid structure capable of resisting warping and deflection. The top of the casting 50 is provided with ways 51, 52, 53 and 54 adapted to support the saddle S. Leveling screws 55 and levels 56 (Fig. 1) are located along each longitudinal side of the casting 50 to facilitate the precise leveling of the casting 50 when it is installed.

The column C comprises a hollow standard 57 of generally rectangular cross section that is rigidly fixed to the casting 50. The standard 57 is provided with vertically-disposed ways 58 and 59 (Fig. 6) adapted to provide sliding surfaces along which the head H is adapted vertically to be reciprocated.

The head H comprises a casting 60 (Fig. 6) that is gibbed to the ways 58 and 59 of the column C by a square lock construction. The head 60 is adapted to support the spindle S' which latter comprises a rotatable and axially movable shaft 61. The shaft 61 is keyed to a hollow shaft 62 that is mounted in anti-friction bearings 63 and 64 within the head 60. Axial feeding movement of the shaft 61 is effected through a nut construction 65 which includes a non-rotatable housing 66 that supports anti-friction bearings 67 and 68 for the tail end of the shaft 61. The housing 66 is fixed to a bracket 69 in which is mounted a threaded nut member 70. A shaft 71 is threaded into the nut member 70 and extends rearwardly thereof for a purpose to be described later. The forward end of the shaft 71 has a spur gear 72 fixed thereto that meshes with a spur gear 73 keyed to a stub shaft 74. A hollow sleeve 75 is keyed to the stub shaft 74 and is splined to a drive shaft 76 mounted within the head 60. The splined shaft 76 is journaled in a tubular bracket 77 that supports the forward end of the threaded shaft 71.

Splined shaft 76 is provided with a bevel gear 78 that meshes with a corresponding bevel gear 79 fixed to a vertical shaft 79', to the bottom of which another bevel gear is fixed (not shown), which latter meshes with a bevel pinion 79'' fixed to a cross shaft 80. Cross shaft 80 includes a bevel pinion 81 that meshes with a bevel pinion 82 splined to a vertically disposed shaft 83 which will be described later. From the foregoing, it is evident that rotation of the splined shaft 83 will cause rotation of the threaded shaft 71 to effect reciprocable action of the nut member 70 as well as bracket 69 and thereby cause axial movement of the spindle 61 at a rate and direction depending upon the rate and direction of rotation of the vertically disposed splined shaft 83.

Figure 6:
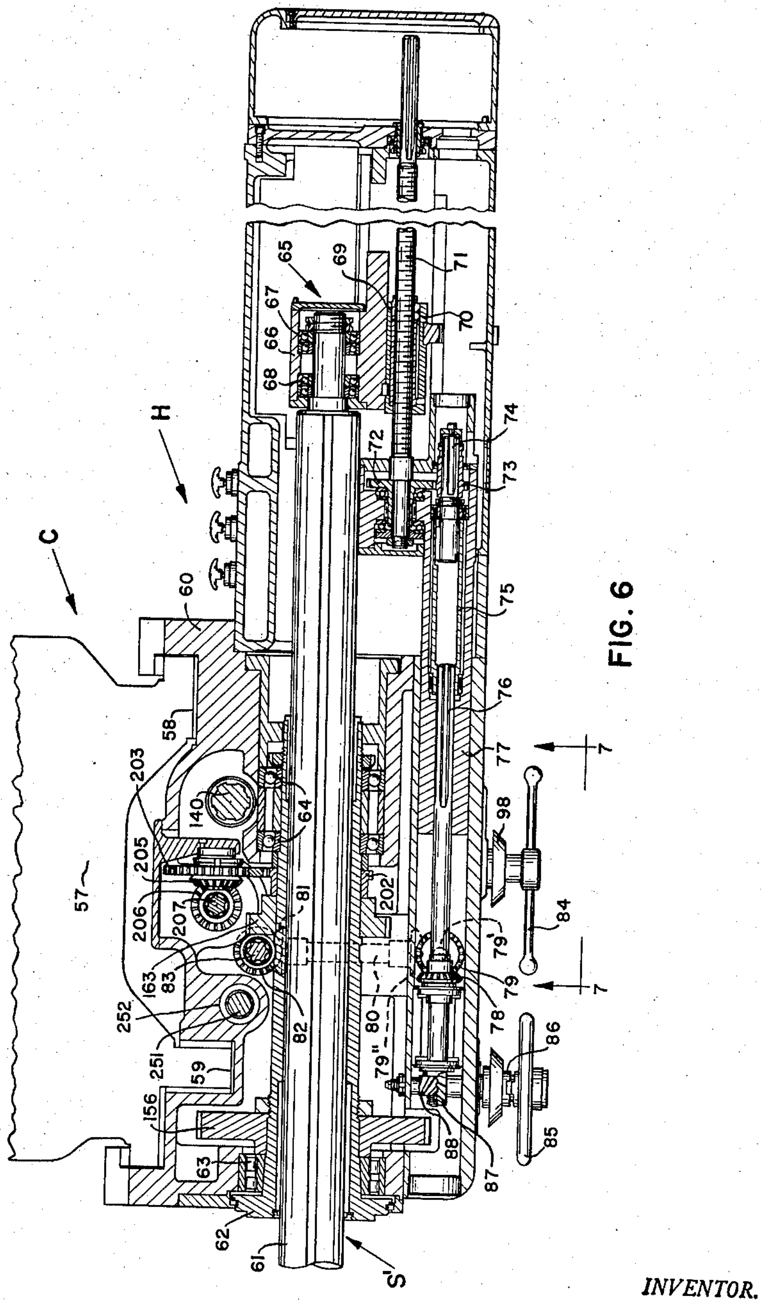
Fig. 6 is a sectional plan view through the head of the horizontal boring mill taken substantially along line 6—6 of Fig. 4.
Figure 8:
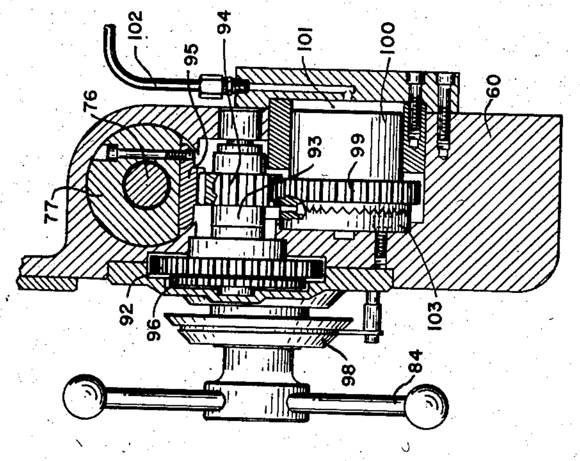
Fig. 8 is a sectional elevational view taken substantially along line 8—8 of Fig. 7.
Figure 7:
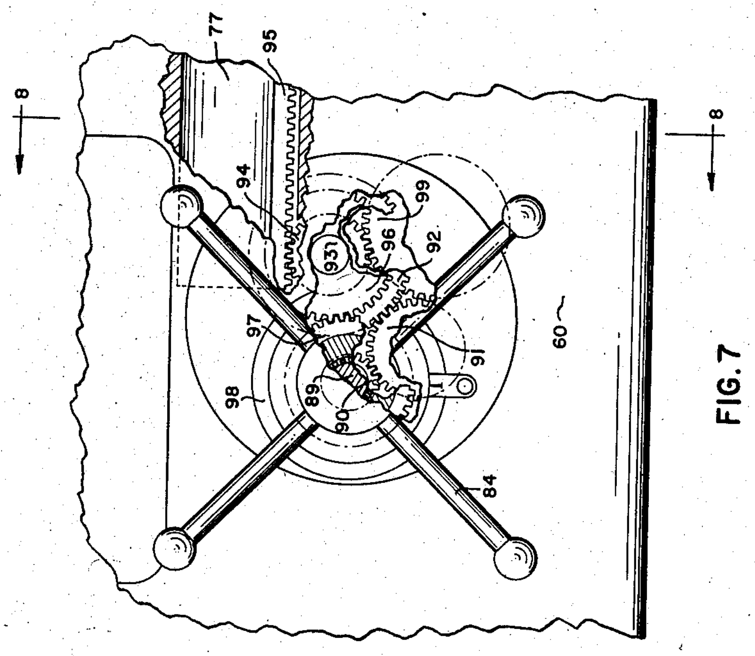
Fig. 7 is a partial front elevational view looking in the direction of the arrows along line 7—7 of Fig. 6.

Referring to Figs. 6, 7 and 8, the shaft 61 is adapted manually to be moved at a relatively rapid rate and a slow rate by the operation of two hand wheels 84 and 85 (Fig. 6). The hand wheel 85 is provided with a releasable connection 86 constructed so that rotation of the splined shaft 76 by shaft 83 will not rotate hand wheel 85. However, forcing the hand wheel 85 inwardly causes the connection 86 to become effective, and subsequent turning of the hand wheel 85 causes turning of a gear 87 fixed to the shaft supporting the hand wheel 85. The gear 87 meshes with a gear 88 fixed to the one end of the splined shaft 76. Accordingly, turning of the hand wheel 85 with connection 86 effective causes rotation of the splined sleeve 75 as well as the gears 73 and 72, thereby rotating the threaded shaft 71 and causing relatively slow axial movement of the shaft 61.

Relatively rapid manual movement of the shaft 61 is effected by the rotation of the hand wheel 84. Referring to Fig. 7, the hand wheel 84 is fixed to a stub shaft 89. A spur gear 90 is likewise fixed to the shaft 89, and it meshes with a spur gear 91 journaled on a stub shaft within the casting 60. The gear 91 is in mesh with a spur gear 92 that is fixed to a shaft 93 (Fig. 8) also located in the casting 60. The shaft 93 is provided with a spur gear 94 that meshes with a rack 95 fixed to the bottom of the tubular member 77 (Fig. 6). An additional spur gear 96 is fixed to the shaft 93, and it meshes with a similar spur gear 97 journaled on the shaft 89 (Fig. 7). The gear 97 is fixed to a dial 98 that is likewise journaled on the shaft 89. The dial 98 accordingly indicates the movement of the tubular member 77 when the latter is moved by the rack 95.

In order to lock the spur gear 94 and, consequently, the tubular member 77 against axial movement when it is desired to move the shaft 61 through the action of the nut 70 on the threaded shaft 71, a locking gear 99 (Fig. 8) is fixed to a piston 100 within a cylinder 101 that is adapted to be supplied with liquid under pressure through an inlet 102. A stationary clutch or brake member 103 is fixed to the casting 60 and its teeth mesh with clutch or brake teeth on the piston 100. The construction and arrangement of the parts are such that introduction of pressure liquid into the cylinder 101 causes the piston 100 to move leftwardly (Fig. 8) whereupon the clutch or brake teeth between the piston 100 and the member 103 intermesh, preventing the rotation of the locking gear 99. When it is desired manually to move the shaft 61 through the action of the rotation of the hand wheel 84, liquid under pressure is exhausted from the cylinder 101. Turning the hand wheel 84 causes the camming action of the clutch or brake teeth between the member 103 and the piston 100 to move the piston rightwardly (Fig. 8) so that the clutch or brake teeth clear each other. Rotation of the hand wheel 84 can then be accomplished to effect the longitudinal movement of the tubular member 77 and, consequently, the movement of the shaft 61.

Referring to Fig. 4, power to move all of the movable parts of the machine tool is supplied from a combined headstock $H_s$ and feedworks F located in the column C near the base B. The headstock $H_s$ includes an input shaft 104 to the one end of which is connected a V-belt pulley 105 adapted to be rotated at a constant rate from an electric motor (not shown). The end of the shaft 104 opposite that supporting the V-belt pulley 105 has fixed to it a spur gear 106 that meshes with a spur gear 107 keyed to a shaft 108. A pair of spur gears 109 and 110 are journaled on the shaft 108 and each includes positive action clutch engaging teeth 111 facing each other, and between which a positive action clutch 112 is adapted to be located. The gears 109 and 110 mesh with corresponding pinions 113 and 114 that are fixed to a shaft 115 that is aligned with, but separated from the input shaft 104. The ratio of the gears 109 and 113 is different from that between gears 110 and 114 so that shifting of the clutch 112 to the right and to the left provides two different rates of rotation of the shaft 115 by the shaft 108. Another pair of spur gears 116 and 117 are journaled on the shaft 108, and a positive action shiftable clutch 118 is located therebetween. The clutch 118 is splined to the shaft 108 so that shifting it either to the right or to the left causes the shaft 108 to drive either gears 116 or 117. The gears 116 and 117 are in mesh with mating gears 119 and 120 fixed to the shaft 115. This arrangement provides two additional ratios at which the shaft 108 can drive the shaft 115 by shifting the clutch 118.

An additional pair of spur gears 121 and 122 are journaled on the shaft 108, and a positive action shiftable clutch 123 is located between them. The gears 121 and 122 mesh with corresponding gears 124 and 125 fixed to the shaft 115. From the foregoing, it is evident that the shaft 115 can be rotated at six different speeds, depending upon the shifting of clutches 112, 118 and 123. Also fixed to the shaft 115 are spur gears 126 and 127. The gears 126 and 127 mesh with gears 128 and 129 that are journaled on a tertiary output shaft 130. A positive action clutch 131 is mounted between the gears 128 and 129 and is adapted to cooperate with positive action clutch engaging teeth on each of said gears. Accordingly, shifting of the clutch 131 to the right and to the left can be employed to cause the tertiary shaft 130 to be rotated at twelve different rates of rotation for a single rate of rotation of the input pulley 105. A spur gear 131' is fixed to the gear 128 on the tertiary shaft 130 and it meshes with a spur gear 132, forming one of an integral cluster of gears that is journaled on the shaft 115. The cluster of gears including the gear 132 also includes two additional gears 133 and 134 that mesh with corresponding gears 135 and 136 that are journaled on the tertiary shaft 130. A positive action clutch 137 is located between the gears 135 and 136, so that shifting of the clutch 137 from right to left can be utilized to provide twelve additional rates of rotation of the output shaft 130 for the single speed of the input shaft 104. From the foregoing, it is evident that the selective shifting of the clutches 112, 118, 123, 131 and 137 provides twenty-four different rates of rotation of the output shaft 130 with the single rate of rotation of the input shaft 104.

Figure 5:
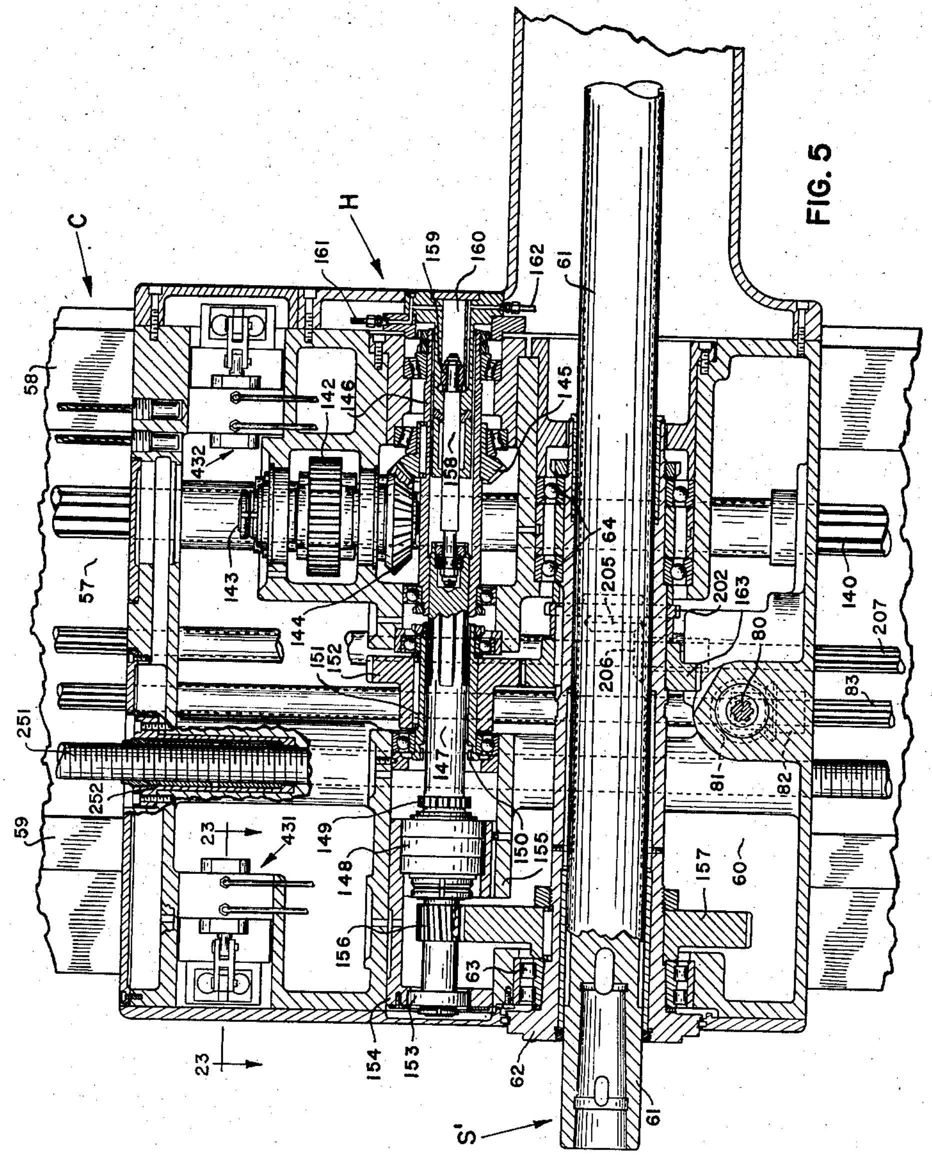
Fig. 5 is a sectional elevation through the head of the machine taken substantially along line 5—5 of Fig. 4.

A bevel pinion 138 is fixed to the output shaft 130 and meshes with a corresponding bevel pinion 139 fixed to a vertically disposed shaft 140. A spur gear 141 journaled in the head 60 is splined to the vertically disposed shaft 140 and meshes with a spur gear 142 on a stub shaft 143 parallel with the shaft 140. The shaft 143 also supports a bevel pinion 144 that meshes with a corresponding bevel pinion 145 that is keyed to a horizontally disposed tubular shaft 146 (Fig. 5). The tubular shaft 146 is suitably journaled in anti-friction bearings within the head H and is splined to a shaft 147 in alignment therewith. The shaft 147 is provided with a positive engagement clutch member 148 that is fixed thereto. The clutch 148 is provided with teeth 149 which are adapted to mesh with teeth 150 on a tubular shaft 151 to which a spur gear 152 is keyed. The tubular shaft 151 is provided with an internal clearance so as not to be connected to the spline of the shaft 147. The opposite end of the shaft 147 from that provided with the spline includes a bearing 153 within a reciprocable bracket 154 mounted within a cored member 155 of the head H. The reciprocable bracket 154 also supports the positive action clutch 148. A spur gear 156 is integral with the shaft 147 and is maintained as an integral part of the clutch 148 at all times. The gear 156 meshes with the gear 157 that is keyed to the tubular shaft 62 which latter is internally keyed to the shaft 61.

The end of the shaft 147 supporting the spline is also provided with a tail rod 158 having at its end opposite that connected to the shaft, a piston 159 that is adapted to be reciprocated within a cylinder 160 that is axially arranged relatively to the shaft 147. Liquid under pressure is adapted to be supplied to the cylinder 160 on the right-hand side of the piston 159 through a line 161. Liquid under pressure is adapted to be admitted to the left-hand side of the piston 159 from a line 162. With the apparatus in the condition as shown in Fig. 5, it is evident that the twenty-four speeds of rotation of the headstock $H_S$ can be transmitted through the vertically disposed shaft 140, gears 141, 142, thence through the gears 156, 157 to the shaft 61. Exhausting line 161 and admitting pressure through line 162 causes the movement of the bracket 154 rightwardly (Fig. 5) together with the gear 156 and the positive action clutch 148 until the teeth 149 enmesh with the teeth 150 on the tubular shaft 151. Accordingly, twenty-four additional rates of rotation are adapted to be transmitted from the vertically disposed shaft 140 through the gear 152 and a meshing spur gear 163 that is keyed to the tubular shaft 62. Accordingly, the shaft 61 is capable of being rotated at 48 different rates of rotation by selectively shifting the various clutches 112, 118, 123, 131, 137 and 148. In the present embodiment, only 36 separate distinct speeds are employed since the remaining twelve are not necessary to accomplish the results of the invention.

Figure 9:
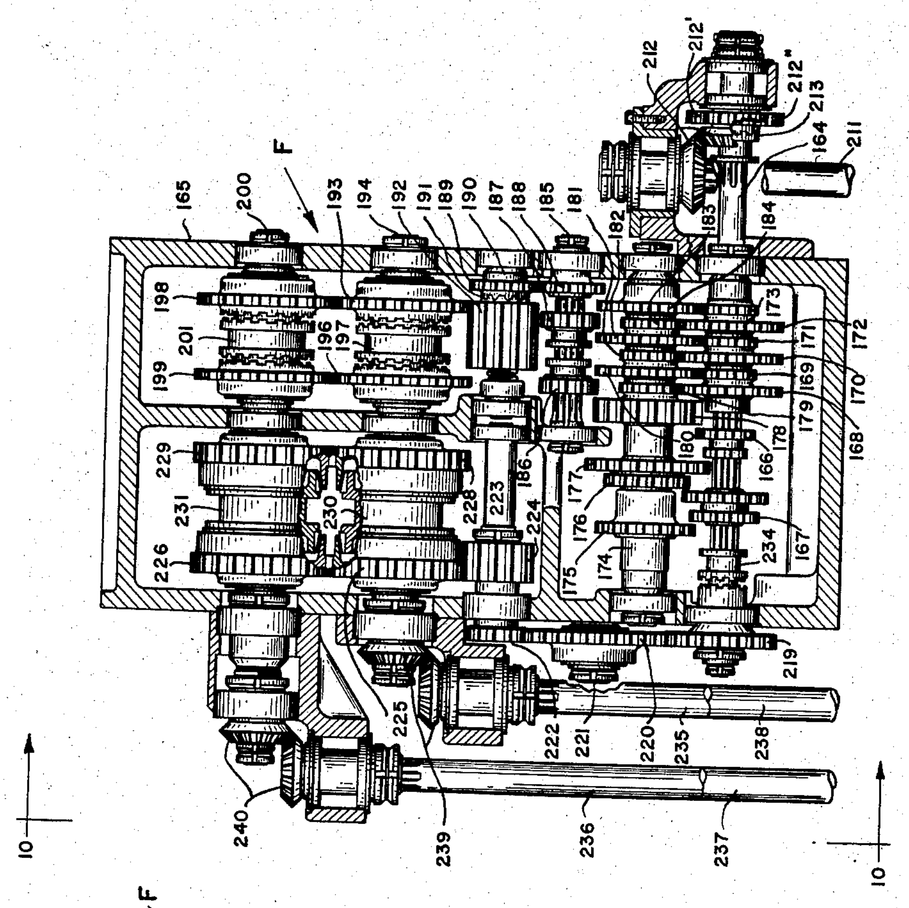
Fig. 9 is an enlarged sectional elevational view of the feedworks shown in Fig. 4 and as viewed by looking in the direction of the arrows along line 9—9 of Fig. 10.
Figure 10:
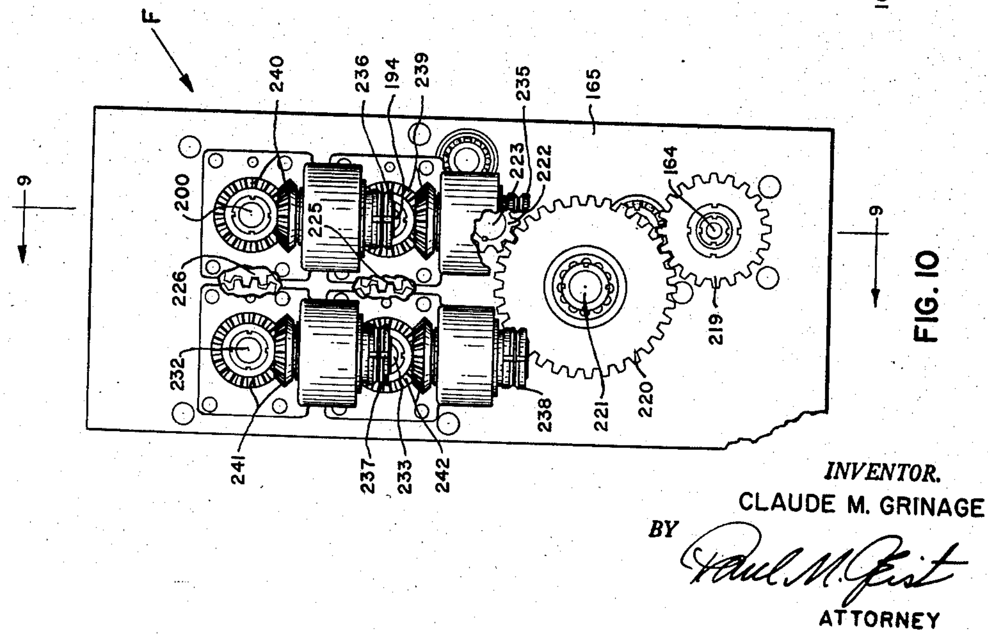
Fig. 10 is an end elevational view looking in the direction of the arrows along line 10—10 of Fig. 9.

An important feature of the present invention is the combining of the headstock $H_S$ and the feedworks F (Fig. 4) wherein the feedworks F is mounted on the top of the headstock $H_S$ forming therewith a unitary structure capable of being employed interchangeably in various horizontal boring mills having different capacities. Referring to Figs. 9 and 10, the feedworks F comprises an input shaft 164 mounted within a frame 165 of the feedworks F. The shaft 164 has splined to it two gear clusters 166 and 167. A plurality of speed reduction gears 168, 169, 170, 171, 172 and 173 are journaled on the input shaft 164. A secondary shaft 174 mounted in the frame 165 in parallel relation with the shaft 164 supports spur gears 175, 176, 177 and 178 that are fixed thereto. The shaft 174 also has journaled on it intermeshing speed reducing gears 179, 180, 181, 182, 183 and 184. Gears 168 and 169 are integral, as are gears 170, 171; 172, 173; 178, 179; 180, 181; and 182, 183. A tertiary shaft 185 parallel to shafts 174 and 164 is also mounted within the frame 165 and it supports shiftable gears 186 and 187. Also fixed to the shaft 185 is a spur gear 188 that meshes with a spur gear 189 on a shaft 190 also within the frame 165. A safety-rattle clutch 191 is provided between the gear 189 and a gear 192 which latter meshes with a gear 193 on a shaft 194 within the frame 165. Referring to Fig. 4, the gear 192 also meshes with a gear 195 that in turn meshes with a gear 196 also mounted on the shaft 194. Accordingly, the gears 193 and 196 rotate in a reverse direction, and a positive action clutch 197 mounted between the gears 193 and 196 can therefore effect the rotation of shaft 194 in either a forward or reverse direction at a speed depending upon the speed of rotation of gear 189.

Gears 193 and 196 mesh with gears 198 and 199 journaled on a shaft 200 parallel to the shaft 194 within the frame 165. A positive action clutch 201 is located between the gears 198 and 199 so that shaft 200 can be rotated in either direction, depending upon the shifting of the clutch 201.

From the foregoing description of the feedworks transmission, it is evident that selectively shifting the gear clusters 166 and 167 can produce four rates of rotation of the shaft 174; and, selectively shifting the shiftable gears 186 and 187 will produce 16 different rates of rotation of the shaft 185 and, consequently, the gears 188 and 189. Accordingly, the feedworks is capable of rotating the output shafts 194 and 200 in either direction at any one of 16 different feed rates.

In order that the feed rates of the output shafts 194 and 200 are related to the rotation of the shaft 61 or spindle S′, power is supplied to the feedworks F from the shaft 61. Accordingly, a spur gear 202 (Figs. 4, 5, 6) meshes with a spur gear 203 on a back shaft 204. A bevel gear 205 on the back shaft 204 meshes with a bevel gear 206 fixed to a vertically disposed shaft 207. At the bottom of the vertically disposed shaft 207 a pair of bevel gears 208 transmits the rotation of shaft 207 to a horizontally disposed shaft 209; and, a pair of bevel gears 210 transmits the rotative power of shaft 209 to another vertically disposed shaft 211 (Fig. 4). Another pair of bevel gears 212 transmits the rotative power from shaft 211 to the input shaft 164 (Fig. 9) of the feedworks F through a pair of pinions 212′ and 212″, the latter being keyed to one portion of a clutch 213 which will be described later.

In order to cause the shafts 200 and 194 to be rotated at a relatively rapid traverse rate in either direction, a spur gear 214 (Fig. 4) is keyed to the shaft 108 of the headstock $H_s$. Gear 214 meshes with a gear 215 on a back shaft (not shown). The gear 215 is integral with a gear 216 which latter meshes with a gear 217 mounted on a stub shaft 218 on a bracket on the bottom of the feedworks F.

The gear 217 meshes with a gear 219 journaled on the shaft 164 (Fig. 9). The gear 219 meshes with a gear 220 journaled on a stub shaft 221 mounted on the frame 165 of the feedworks F, and said gear 220 meshes with a pinion 222 that is fixed to a shaft 223 within the bracket 165 and aligned with, but separated from the shaft 190.

A gear 224 on the shaft 223 meshes with a gear 225 journaled on the shaft 194 which in turn meshes with a gear 226 journaled on the shaft 200. The gear 224 on the shaft 223 also meshes with a multiple gear 227 (Fig. 4), providing a reverse rotation for gears 228 and 229 journaled on shafts 194 and 200, respectively. Friction clutches 230 and 231 are provided between gears 225 and 228 on shaft 194, and between gears 226 and 229 on shaft 200, respectively. From the foregoing discussion, it is evident that the shafts 194 and 200 can be caused to rotate in either direction at a relatively rapid traverse rate of speed by selectively shifting the friction clutches 230 and 231.

Referring to Fig. 10, the gears 193, 196, 198, 199, 225, 228, 226 and 229 mesh with identical gears on additional shafts 232 and 233 in parallel relation with the shafts 194 and 200 within the bracket 165 of the feedworks F. In this way, the shafts 194, 200, 232 and 233 can be rotated in either direction at any one of 16 different rates of feed as well as rotated in either direction at a relatively rapid traverse rate of speed. In the horizontal boring mill art, it is often desirable to move the various elements at a feed rate that is measured in inches per minute or feet per minute as distinguished from inches per revolution. This has been accomplished in the present invention by employing a clutch 234 (Fig. 9) that is moved into engagement with the gear 219 simultaneously with the disengagement of the clutch 213. In this case, the relatively rapid input speed of the headstock is employed to operate the speed reduction units including the shiftable gears 166, 167, 186 and 187. When the speed reduction unit of the feedworks F is driven through the clutch 234, the feed rate of the shafts 194, 200, 232 and 233 is measured in inches per minute rather than inches per revolution.

Referring to Fig. 10, the output shafts 194, 200, 232 and 233 are connected to four vertically disposed drive shafts 235, 236, 237 and 238, respectively, by sets of bevel pinions 239, 240, 241 and 242, respectively.

Figures 11, 12:
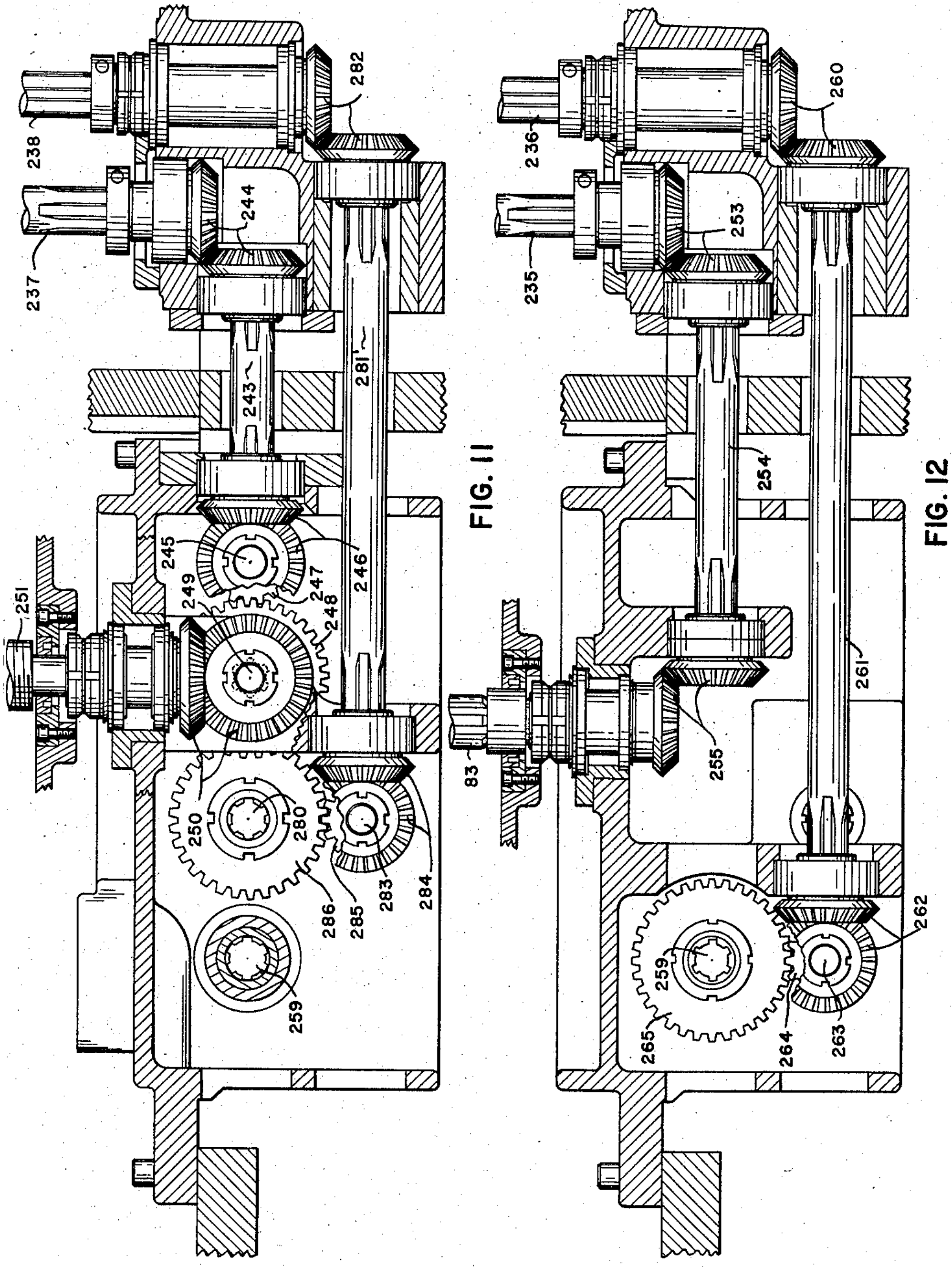
Fig. 11 is a sectional elevational view taken substantially along line 11—11 of Fig. 1.
Fig. 12 is a sectional elevational view taken substantially along line 12—12 of Fig. 1.

Referring to Fig. 11, the vertically disposed drive shaft 237 is connected to a horizontally disposed shaft 243 through a bevel train 244. The shaft 243 is connected to a stub shaft 245 through another bevel train 246. A spur gear 247 fixed to the stub shaft 245 meshes with a spur gear 248 fixed to a splined shaft 249 extending from the column C to the rear post P′. A pair of bevel gears 250 transmits the rotative power supplied to the splined shaft 249 to a threaded shaft 251 that extends vertically throughout the height of the column C (Fig. 1). The threaded shaft 251 threadingly engages a nut member 252 (Figs. 5 and 6) that is fixed to the casting 60 of the head H. Accordingly, rotation of the threaded shaft 251 causes the head H to move vertically along the ways 58 and 59 of the column C, and at any one of 16 different feed rates as well as at a relatively rapid traverse rate.

Referring to Figs. 10 and 12, the vertically disposed drive shaft 235 is connected through a pair of bevel pinions 253 to a shaft 254. The shaft 254 is connected through a pair of bevel gears 255 to the splined shaft 83 (Figs. 12 and 6). Accordingly, the rotation of the vertically disposed drive shaft 235 at any one of 16 different feed rates in either direction as well as at a rapid traverse rate in either direction causes the corresponding rotation of the splined shaft 83, which, as previously described, effects feed and traverse movement of the shaft 61 through the rotation of the threaded shaft 71. From the foregoing, it is evident that the shaft 61 may be rotated at any one of 36 different rates of rotation and axially fed in either direction at any one of 16 different rates of feed movement as well as axially traversed in either direction by the selective actuation of the various clutches within the feedworks F and the headstock $H_s$ as previously described.

Referring to Fig. 13, the saddle S comprises an elongated casting 256 having bearing ways adapted to cooperate with the ways 51, 52, 53 and 54 of the bed B, as well as a gibbed construction 257 and 258 for preventing any lifting action of the saddle S from the bed B. The saddle S is adapted to be reciprocated longitudinally of the bed B by the rotation of a screw 259 that extends throughout the longitudinal extent of the bed B and terminates beneath the column C. Referring to Fig. 12, the vertically disposed shaft 236 leading from the feedworks F is connected through a pair of bevel gears 260 to a shaft 261. The shaft 261 is connected through a pair of bevel gears 262 to a stub shaft 263. The stub shaft 263 has fixed to it a spur gear 264 that meshes with a spur pinion 265 splined to the screw 259. Accordingly, since the shaft 236 is capable of being rotated in either direction at any one of 16 different feed rates, either in accordance with revolutions per minute of the shaft 61 or in accordance with inches per minute, as well as at a relatively rapid traverse rate, it is evident that the screw 259 and, consequently, the saddle S can likewise be moved longitudinally of the bed B at any one of said feed or traverse speeds, depending upon the selective actuation of the various clutches within the feedworks F and headstock $H_s$.

Referring again to Fig. 13, the work-supporting table T comprises a casting 266 that is suitably ribbed and cored to provide a suitable work-supporting table for the horizontal boring mill. It is provided with way surfaces adapted to ride along the ways 267 and 268 (Fig. 3) of the saddle S. Transverse movement of the table T relatively to the longitudinal movement of the saddle S is adapted to be effected by the rotation of a nut threaded on a shaft 269 that is supported at 270 and 271 within the extremities of the table T. A key 272 within the support 270 fixes the threaded shaft 269 against rotation. A nut 273 is threaded on the shaft 269 and it is located within a bracket 274 that is fixed to the table T. The bracket 274 extends through a cored-out opening 275 within the saddle S into an opening 276 within the base B. A rotatably mounted bevel gear 277 is keyed to the nut element 273 and it meshes with a bevel pinion 278 fixed to one end of a stub shaft 279 mounted within the bracket 274. The opposite end of the stub shaft 279 is connected to a splined shaft 280 through a pair of bevel pinions 281. Accordingly, rotation of the splined shaft 280 in opposite directions will effect the reciprocation of the table T along the ways 267 and 268 of the saddle S.

Referring to Fig. 11, the vertically disposed shaft 238 is connected to a shaft 281′ through a pair of bevel gears 282. The shaft 281′ is in turn connected to a stub shaft 283 by a pair of bevel gears 284. A spur pinion 285 is fixed to the stub shaft 283 and it meshes with a spur gear 286 that is fixed to the splined shaft 280. Since the vertically disposed shaft 238 of Fig. 11 is adapted to be rotated at any one of 16 different rates of speed either in relation to revolutions per minute of the shaft 61 or in relation to inches per minute, as well as at a relatively rapid traverse rate, it follows that the table T can accordingly be moved along the ways 267 and 268 of the saddle S at any one of the feed rates or traverse rate by the selective actuation of the various clutches within the feedworks F.

Figure 14:
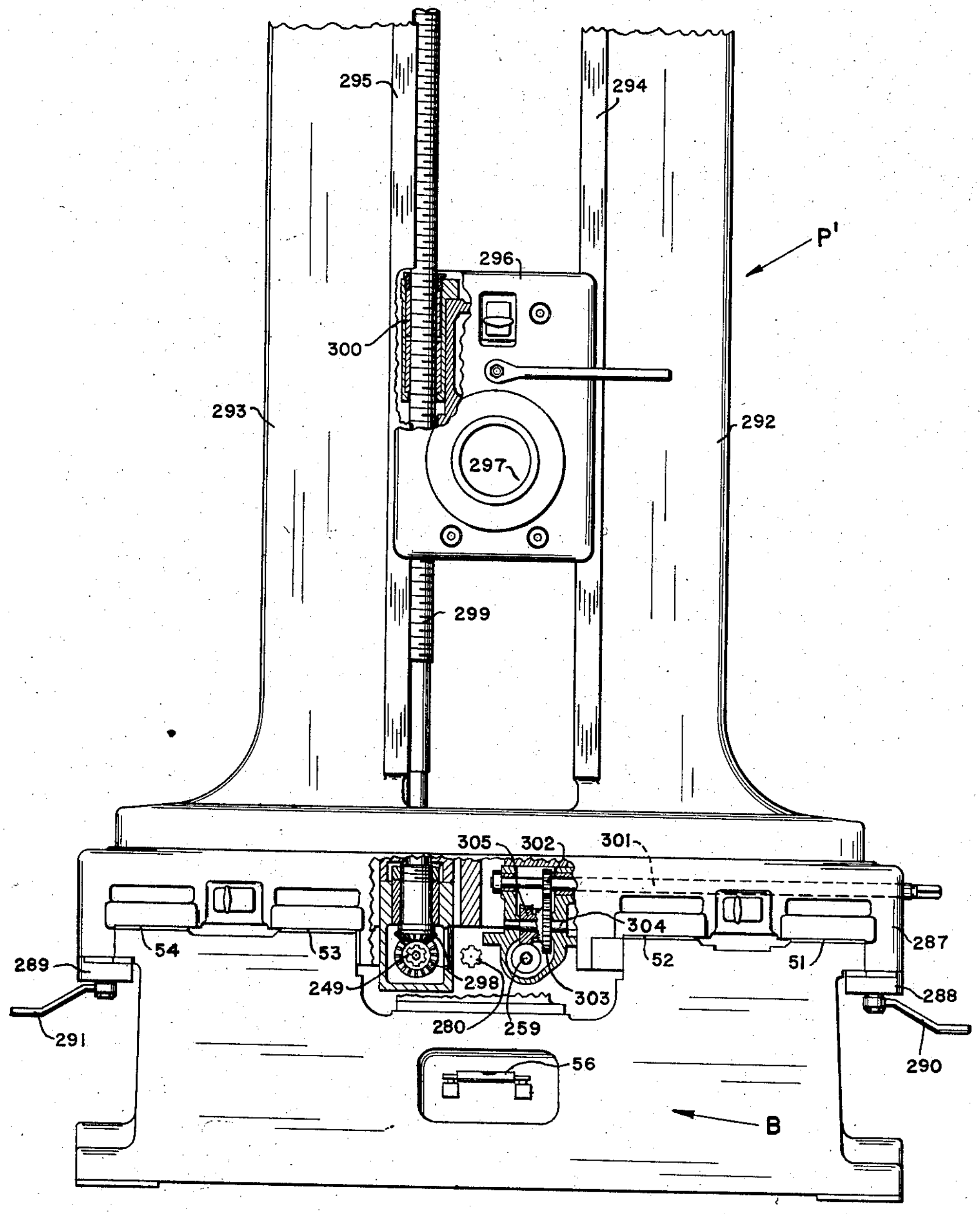
Fig. 14 is an end elevational view looking in the direction of the arrows along line 14—14 of Fig. 1.

Referring to Fig. 14, the rear post P′ comprises a base member 287 that contains ways adapted to cooperate with the ways 51, 52, 53 and 54 on the base B. It is likewise provided with clamp elements 288 and 289 that cooperate with ways 51 and 54 to provide a square lock construction, thereby preventing the tilting of the rear post P′ on the bed B. Clamping levers 290 and 291 are provided for releasably locking the rear post P′ in an adjusted position along the ways 51, 52, 53 and 54 of the base B.

The rear post P′ also includes vertically extending uprights 292 and 293 which are integrally united to the base 287. These uprights 292 and 293 have vertically disposed bearing ways 294 and 295 along which the rear post spindle head 296 is adapted vertically to be reciprocated. The rear post spindle head 296 includes the usual collet member 297 and inasmuch as the collet member 297 must move in perfect alignment with the shaft 61 of the head H, the means that vertically moves the head H is employed to vertically move the collet 297. Accordingly, the splined shaft 249 that drives the main head lifting screw or threaded shaft 251 (Fig. 11) extends rearwardly to a point adjacent the end of the base B. It includes a pair of bevel gears 298 which transmits the rotative power of the shaft 249 to a vertically disposed threaded shaft 299. The threaded shaft 299 cooperates with a nut element 300 fixed against rotation within the rear spindle head 296. Accordingly, rotation of the threaded shaft 299 in either direction vertically reciprocates the rear post head 296 to maintain the collet 297 at all times in perfect alignment with the shaft 61 within the head H.

In order manually to move the tail post P′ along the ways of the bed B, a rotatable shaft 301 is journaled in the base 287. It supports a spur gear 302 that meshes with a spur gear 303 on a stub shaft 304. Fixed to the gear 303 is a worm gear 305 that cooperates with the screw 259. Accordingly, with the binders 290 and 291 loosened, and the threaded shaft 259 stationary, manual rotation of the shaft 301 will effect the movement of the rear post P′ in a manner in which the gear 305 and screw 259 act as a rack and pinion.

Figure 15:
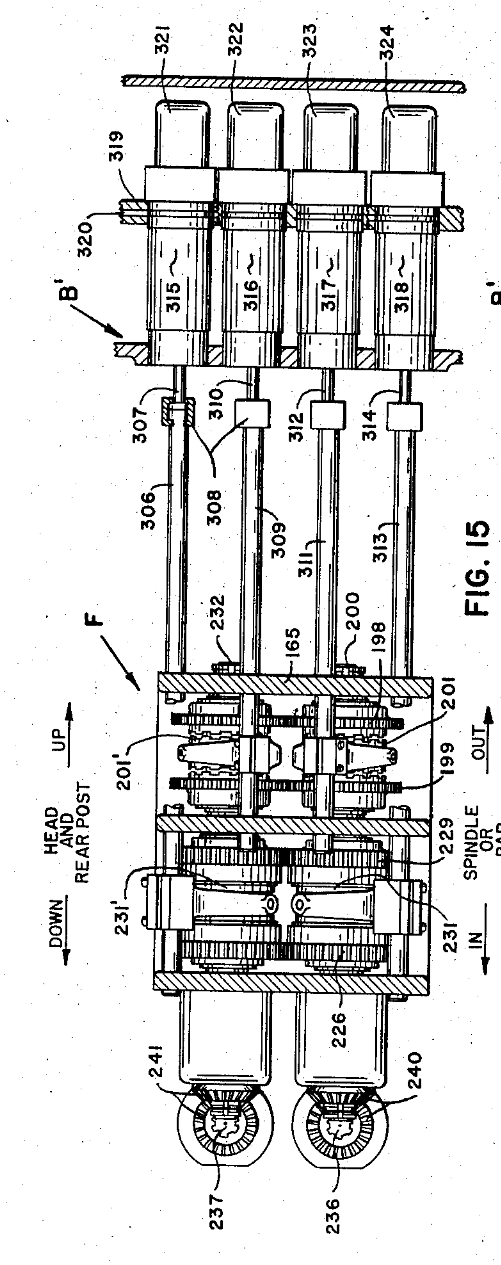
Fig. 15 is a sectional plan view taken substantially along line 15—15 of Fig. 4.

Referring to Fig. 4, it is evident that all of the elements of the machine tool that are caused to be translated by power can be effected by the selective shifting of the various clutches within the feedworks F and the headstock $H_s$. In the present embodiment of the invention, the arrangement of the headstock $H_s$ and the feedworks F is such that all of the shiftable clutches are arranged for actuation by parallel, clutch-shifting rods. These parallel, clutch-shifting rods extend to and are connected with individual hydraulically-operated solenoid-controlled piston mechanisms within the bracket B′. Referring to Fig. 15, the shafts 200 and 232 of the feedworks F are shown with their corresponding clutches 201, 231; and, 201′, 231′, respectively. The clutch shifting finger for the clutch 231′ is rigidly fixed to a reciprocable bar 306 that is connected to a piston rod 307 by a coupling element 308. The clutch shifting finger for the clutch 201′ is rigidly connected to a rod 309 that is attached to a piston rod 310 through an identical coupling element 308. The clutch shifting finger for the clutch 201 is rigidly connected to a bar 311 that is likewise attached to a piston rod 312; and, the clutch shifting finger for the clutch 231 is rigidly connected to a bar 313 that is attached to a piston rod 314. Each of the piston rods 307, 310, 312 and 314 extend into cylinders 315, 316, 317 and 318 mounted within the bracket B′ which latter includes a plate 319 having bores to receive the cylinders. The plate 319 is provided with a fluid distributing passage 320 extending throughout its length and opening successively into the bored openings within the plate 319 into which the cylinders 315 to 318 extend.

Figures 19, 24:
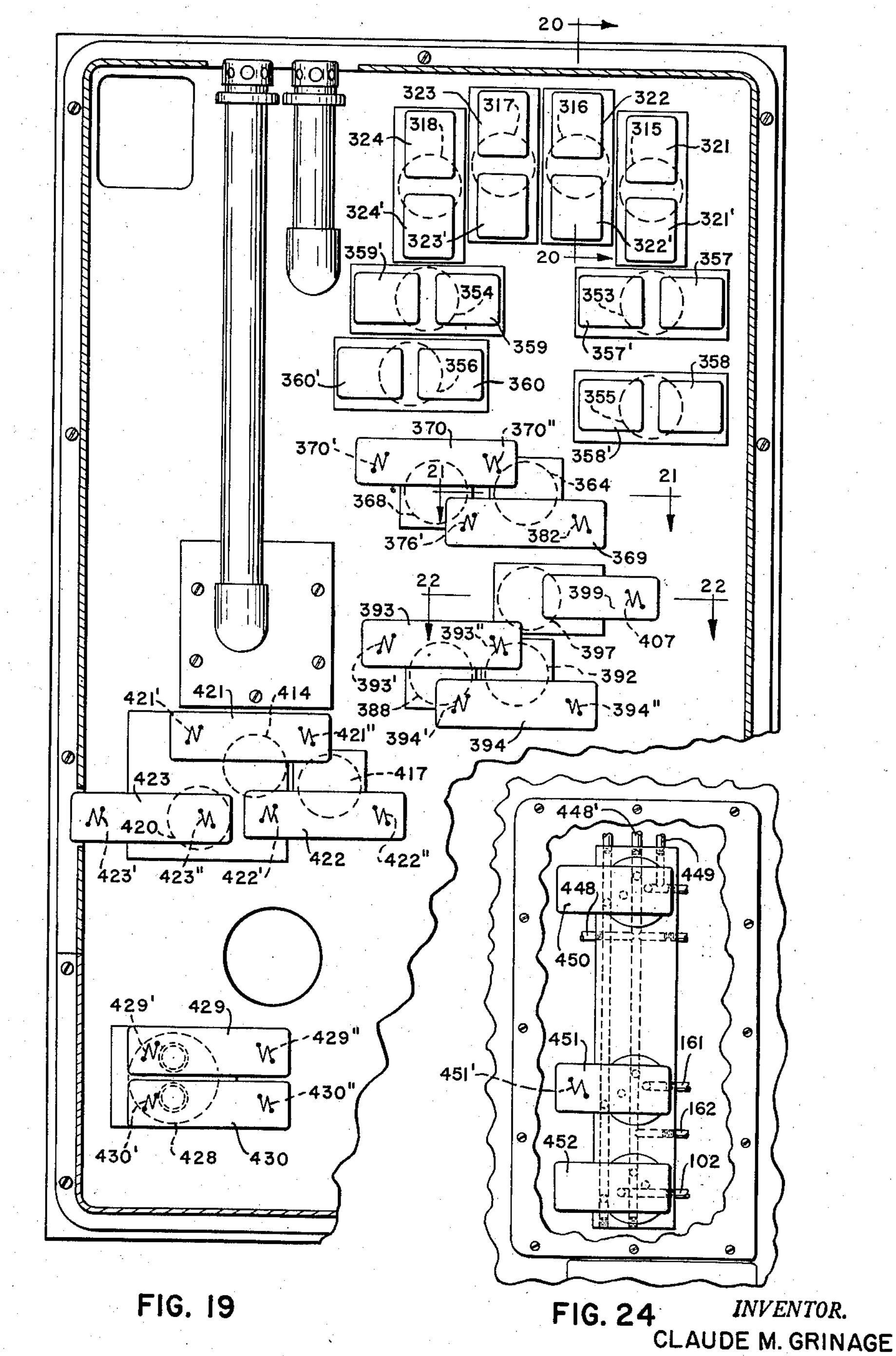
Fig. 19 is a sectional elevational view taken substantially along line 19—19 of Fig. 4.
Fig. 24 is an elevational view of a portion of Fig. 1 located on the head of the horizontal boring mill.
Figure 20:
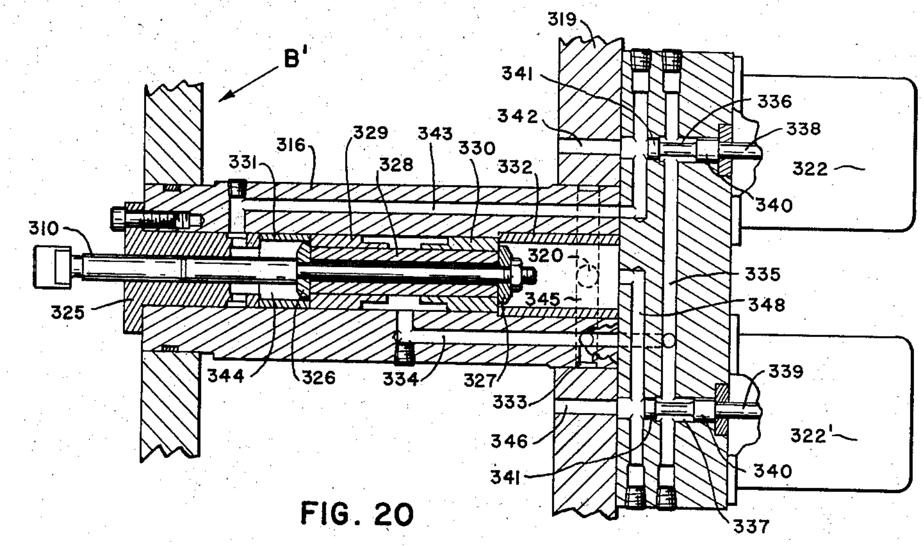
Fig. 20 is a sectional elevational view taken substantially along line 20—20 of Fig. 19.

Referring to Figs. 15 and 19, solenoid valves 321, 321′; 322, 322′; 323, 323′; and 324, 324′ are provided for controlling the flow of liquid to and from the respective cylinders 315 to 318. Referring to Fig. 20, the piston rod 310 extends into the cylinder 316 through a stuffing box 325. The inner end of rod 310 is reduced in diameter and supports spaced discs 326 and 327 between which is located a sleeve 328. Slidably mounted on the exterior of the sleeve 328 are identical piston elements 329 and 330 disposed in opposed relationship to each other on the sleeve 328. Additional sleeves 331 and 332 are located within the cylinder 316 and limit the movement of the pistons 329 and 330 in a direction away from each other. The construction and arrangement of the solenoid-controlled valves can be best understood from a description of their operation. Liquid under pressure is admitted through the common line 320 to an annular space 333 surrounding the outer periphery of the cylinder 316. The annular passage 333 merely permits the liquid to flow to the continuation of the passage 320 above and below the cylinder 316. Liquid entering the annular passage 333 is adapted to be supplied to a passage 334 that conducts the liquid under pressure to the space between the pistons 329 and 330, thereby separating them so that they abut against the limiting sleeves 331 and 332, respectively. Additionally, liquid in passage 334 is admitted to a duct 335 that communicates with cross passages 336 and 337 within which valve stems 338 and 339 are adapted to extend. The valve stems 338 and 339 are provided with portions 340 and 341 for controlling the flow of the liquid from the passage 335 to the cylinder 316. The portions 341 of the valve stems 338 and 339 are of a smaller diameter than the portions 340 thereof, so that a differential piston mechanism is provided for each of the valve stems 338 and 339. Accordingly, the fluid under pressure within the passage 335 continuously urges both valve stems 338 and 339 to the positions shown in Fig. 20. Energization of the solenoid 322 causes the valve stem 338 to move leftwardly (Fig. 20) whereupon the portion 341 of the stem 338 closes an exhaust port 342 and admits the liquid from passage 335 through a duct 343 thence into a chamber 344 where it acts upon the disc 326. Inasmuch as the area of the disc 326 is substantially greater than the annular area of the piston element 329 that is subjected to the pressure liquid from passage 334, and since the chamber 345 is open to the exhaust port 346, the piston element 329 moves rightwardly until it abuts the piston element 330. This moves the rod 309 rightwardly and causes the clutch 201′ to engage the right-hand gear (Fig. 15). De-energization of the solenoid 322 immediately causes the pressure liquid in the line 335 to act on the portion 340 of the valve stem 338 thereby retracting it to the position shown in Fig. 20 whereupon the exhaust port 342 communicates with the chamber 344. Consequently, the constant pressure within the line 334 separates the piston elements 329 and 330 to cause the movement of the clutch 201′ to its neutral position as shown in Fig. 15.

In a like manner, energization of the solenoid 322′ causes the valve stem 339 to move leftwardly (Fig. 20) whereupon the portion 341 thereof closes the exhaust port 346 and permits the liquid within the passage 335 to be admitted through a passage 348 to the chamber 345. Since chamber 344 is now open to the exhaust 342, the piston 330 moves leftwardly until it abuts the piston member 329 thereby moving the rod 309 leftwardly to cause the clutch 201′ to engage the left-hand gear (Fig. 15). Upon the de-energization of the solenoid 322′, the pressure within the passage 335 immediately acts on the larger portion 340 of valve stem 339 thereby causing it to move rightwardly which opens the chamber 345 to the exhaust port 346. Accordingly, the pressure liquid within the line 334 immediately neutralizes the clutch 201′. From the foregoing, it is evident that the neutralization of the clutch 201′ is substantially instantaneous, and is not dependent upon the operation of a series of relays. Its immediate neutralization is effected even before the complete de-energization of the solenoids 322 or 322′. In other words, as soon as the flux density within the solenoids 322 and 322′ decreases to a point where the force of the liquid within passage 335 acting on the portions 340 of valve stems 338 and 339 overcomes such flux density, then the valve stems snap to their exhaust positions.

While the solenoid valves 322 and 322′ have been specifically described, the valves 321, 321′, 323, 323′, 324 and 324′ are identical and need no further elaboration.

Referring to Figs. 15 and 19, it is evident that the energization of the solenoid valves 321 and 321′ causes the shifting of the clutch 231′ to engage its right-hand and its left-hand gears respectively. De-energization of these solenoid valves instantly causes clutch 231′ to become neutralized. In the same way solenoid valves 322 and 322′ control the shifting of the clutch 201′, solenoid valves 323 and 323′ control the shifting of the clutch 201 and solenoid valves 324 and 324′ control the shifting of clutch 231.

Figure 16:
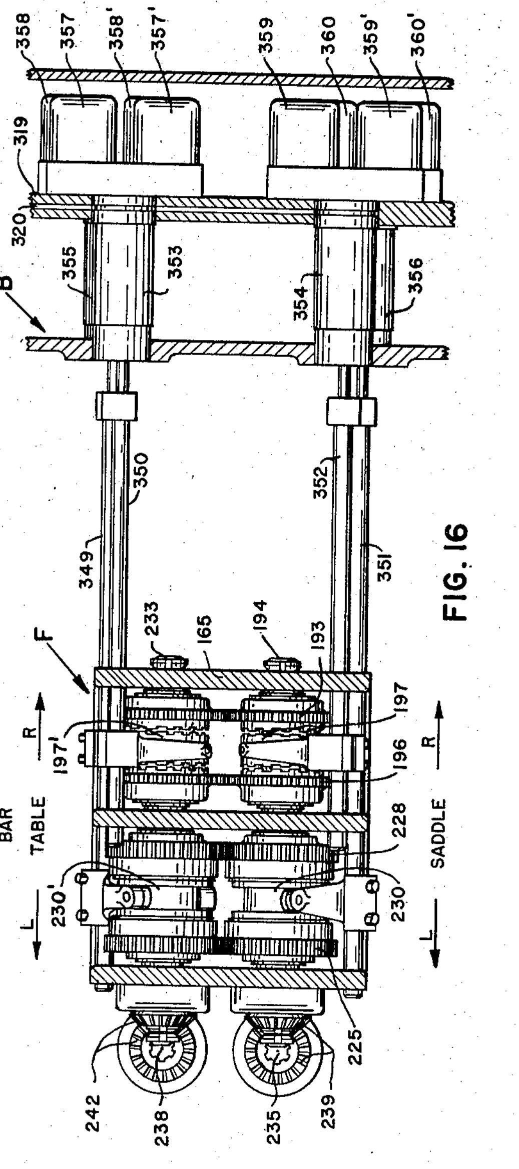
Fig. 16 is a sectional plan view taken substantially along line 16—16 of Fig. 4.

Referring to Fig. 16, the clutch shifting finger for clutch 230′ is fixed to a draw bar 349; the clutch finger for clutch 197′ is connected to a draw bar 350; the clutch finger for the clutch 230 is connected to a draw bar 351; and, the clutch finger for the clutch 197 is connected to a draw bar 352. The draw bars 349, 350, 351 and 352 are connected to piston rods that extend into cylinders 355, 353, 356 and 354, respectively, in the same manner that the draw bars 306, 309, 311, and 313 are connected to the piston rods that extend into the cylinders 315, 316, 317 and 318. Additionally solenoid valves 357, 357′ control the shifting of the clutch 197′; the solenoid valves 358, 358′ control the shifting of the clutch 230′; the solenoid valves 359, 359′ control the shifting of the clutch 197; and, the solenoid valves 360, 360′ control the shifting of the clutch 230 all in the manner in which the solenoids 322 and 322′ control the shifting of the clutch 201′.

Figure 17:
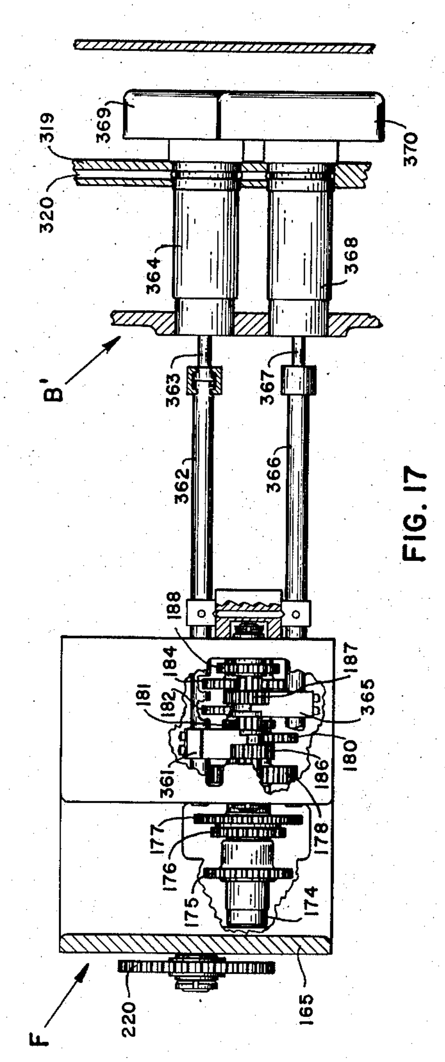
Fig. 17 is a sectional plan view taken substantially along line 17—17 of Fig. 4.
Figure 21:
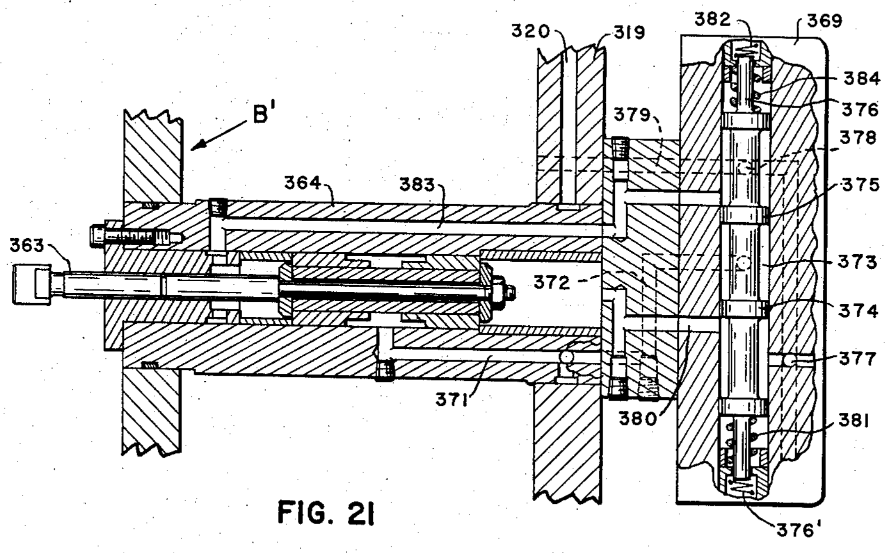
Fig. 21 is a sectional plan view taken substantially along line 21—21 of Fig. 19, but rotated counterclockwise through 90°.

Referring to Figs. 9 and 17, the shiftable gear 186 is provided with a shifting finger 361 that is fixed to a draw bar 362 connected to a piston rod 363 extending into a cylinder 364. The shiftable gear 187 is likewise provided with a shifting finger 365 that is rigidly connected to a bar 366 that is connected to a piston rod 367 extending into a cylinder 368. Solenoid-operated valves 369 and 370 are provided for controlling the operation of the shiftable gears 186 and 187, respectively. Referring to Fig. 21, the piston rod 363 extends into the cylinder 364 and is provided with a piston mechanism substantially identical with that shown in Fig. 20. The solenoid-operated valve 369, however, is somewhat different from that shown in Fig. 20, and its operation will be understood by the following description. Liquid from the common passage 320 within the bored plate or supporting bracket 319 is adapted to be supplied through the duct 371 to cause the piston mechanism within the cylinder 364 to continuously urge the piston rod 363 and, consequently, the shiftable gear 186 into a neutral position at all times. Liquid under pressure within the passage 371 is also adapted to pass through a duct 372 leading to a valve bore 373 between flanges 374 and 375 of the valve stem 376. With the valve stem 376 in the position shown, the right-hand side of the piston mechanism within the cylinder 364 is open to the exhaust 377, and the left-hand side of the piston mechanism is open to the exhaust through the duct 378. Both the ducts 377 and 378 communicate with a common exhaust duct 379. Movement of the stem 376 downwardly by energizing solenoid 376′ causes the passage 372 to become connected to a passage 380 leading into the chamber on the right-hand side of the piston mechanism within the cylinder 364, thereby causing the piston rod 363 to move leftwardly and, consequently, the gear 186 to become enmeshed with the gear 178. Upon de-energization of the solenoid 376′ a spring 381 returns the valve stem 376 to the position shown in Fig. 21. Energization of the solenoid 382 effects movement of the stem 376 upwardly, thereby causing the liquid under pressure in passage 372 to flow through the duct 383, hence moving the piston mechanism within the cylinder 364 rightwardly and, consequently, causing the gear 186 to be moved into engagement with the gear 180 (Fig. 17). Upon de-energization of the solenoid 382 a spring 384 returns the valve stem 376 to the position shown in Fig. 21.

Referring to Figs. 4, 9 and particularly 18, the gear cluster 167 is provided with a shifting finger 385 that is fixed to a draw bar 386 connected to a piston rod 387 that extends into a cylinder 388. Gear cluster 166 is provided with a clutch shifting finger 389 fixed to a draw bar 390 that is connected to a piston rod 391 extending into a cylinder 392. The cylinders 392 and 388 include piston mechanisms adapted to be controlled by solenoid-operated valves 393 and 394 in the same manner that the piston mechanism within the cylinder 364 is controlled by the solenoid-operated valve 369 (Fig. 21).

Figure 22:
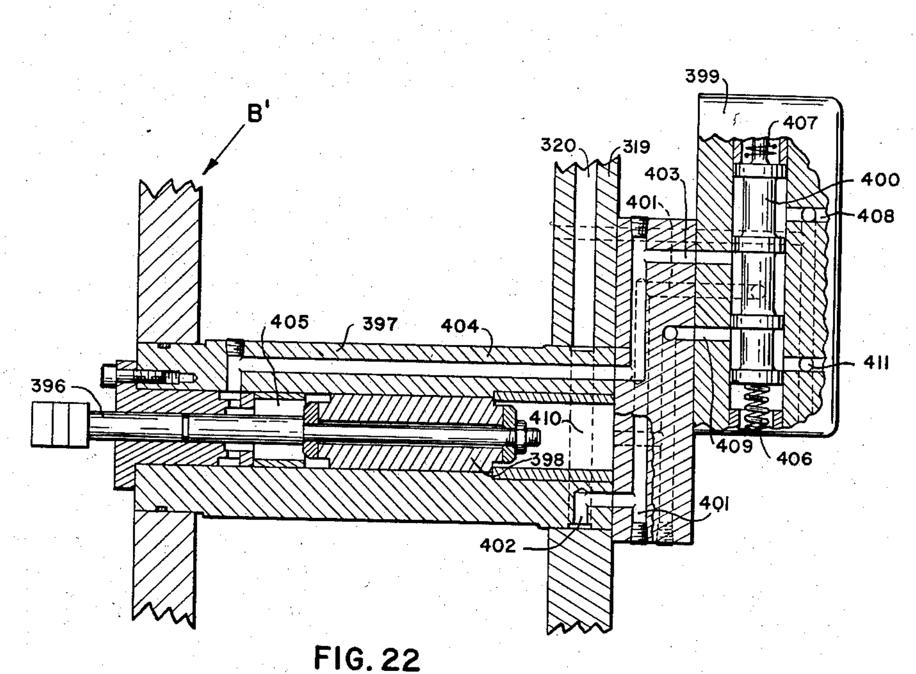
Fig. 22 is a sectional plan elevational view taken along line 22—22 of Fig. 19, but rotated counterclockwise through 90°.

In order to operate the feedworks F so that it produces a feed in inches per revolution of the shaft or spindle 61, the clutch 213 (Fig. 18) must be engaged and the clutch 234 must be disengaged. When it is desired to operate feedworks F such that the feeding movement produced by it is in inches per minutes, the clutch 234 must be engaged and the clutch 213 disengaged. Accordingly, clutch-shifting fingers for the clutches 234 and 213 are rigidly fixed to a draw bar 395 that is connected to a piston rod 396 extending into a cylinder 397. Referring to Fig. 22, the piston rod 396 is connected to a piston 398 that is adapted to be reciprocated within the cylinder 397, under the control of a solenoid-operated valve 399. Referring to Fig. 22, the solenoid-operated valve 399 includes a stem 400 adapted to control the flow of liquid under pressure from the main line 320 that is continuously supplied to a passage 401 by a duct 402. With the valve stem 400 in the position shown in Fig. 22, liquid under pressure from the duct 401 passes through a line 403 leading to a passage 404 that extends to and is in communication with a chamber 405 on the left-hand side of the piston 398. Accordingly, the piston 398 is moved rightwardly so that the clutch 213 is engaged and the clutch 234 is disengaged. Accordingly, the feedworks F effects a feed movement in inches per revolution of the shaft 61 of the spindle S′. The valve stem 400 is maintained in the position shown in Fig. 22 by a compression spring 406. Energization of a coil 407 of the solenoid valve 399 causes the stem 400 to move downwardly thereby opening the duct 403 to an exhaust port 408, and providing communication between the passage 401 and a passage 409 that leads to the chamber 410 on the right-hand side of the piston 398. Accordingly, under such circumstances, the piston 398 is moved leftwardly, thereby effecting engagement of the clutch 234 and the disengagement of the clutch 213 whereupon the feedworks F will effect a feeding movement in inches per minute. De-energization of the solenoid 407 causes spring 406 to return the stem 400 to the position shown in Fig. 22, whereupon the passage 409 leading to the chamber 410 is open to an exhaust 411.

Referring again to Fig. 4, the clutch-shifting finger for the clutch 118 is rigidly fixed to a draw bar 412 that is connected to a piston rod 413 extending into a cylinder 414. Likewise, the clutch-shifting finger for the clutch 123 is rigidly fixed to a draw bar 415 that is attached to a piston rod 416 extending into a cylinder 417, only a portion of which is shown in Fig. 4. Additionally, the clutch-shifting finger for the clutch 112 is rigidly fixed to a bar 418 that is connected to a piston rod 419 extending into a cylinder 420. Each of the cylinders 414, 417 and 420 is provided with a double-acting solenoid-operated valve 421, 422 and 423. The construction and arrangement of these solenoid-operated valves and their corresponding cylinders and pistons are the same as those of the solenoid-operated valve 369 and its corresponding cylinder 364 shown in Fig. 21. Accordingly, the solenoid valve 421 (Fig. 19) is provided with two energizable solenoids 421′ and 421″; the solenoid valve 422 is provided with two solenoids 422′ and 422″; and the solenoid valve 423 is provided with two solenoids 423′ and 423″. Accordingly, selective energization of the solenoids within the valves 421, 422 and 423 will effect the connection between the shaft 108 and the gears 109, 110, 116, 117, 121 and 122.

Referring again to Fig. 4, the clutch-shifting finger for the clutch 137 is connected to a draw bar 424 that is connected to a piston rod 425; and, the clutch-shifting finger for the clutch 131 is connected to a draw bar 426 that is connected to a piston rod 427. The piston rods 425 and 427 extend into cylinders within a housing 428. Solenoid valves 429 and 430 are mounted on an end of the housing 428 and they include solenoids 429′, 429″; and 430′, 430″, respectively, all of which operate in the same manner as the solenoids 376′ and 382 within the solenoid valve 369 of Fig. 21.

From the foregoing, it is evident that the selective energization of the solenoids within the solenoid valves shown in Fig. 19 will cause the selective actuation of the various movable elements of the horizontal boring mill as desired.

Figure 23:
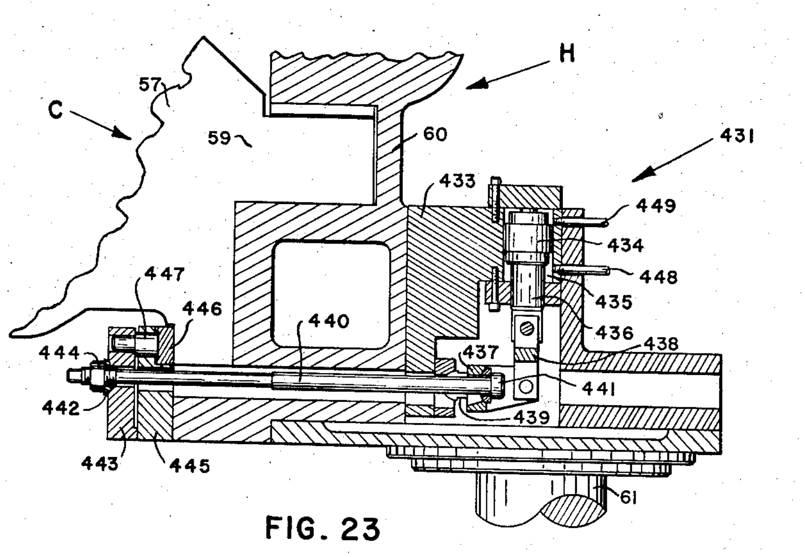
Fig. 23 is a sectional plan view taken substantially along line 23—23 of Fig. 5.

Referring to Figs. 5 and 23, binding devices 431 and 432 are provided for releasably locking the head H to the column C at any adjusted height. Inasmuch as the binding devices are identical, except in the relationship as shown in Fig. 5, only the binding device 431 will specifically be described. It includes a bracket 433 (Fig. 23) fixed to the casting 60 of the head H. A piston 434 is adapted to be reciprocated within a cylinder 435 formed in the member 433. Piston 434 is provided with a piston rod 436 that is connected to a link 437 by a connector 438. Link 437 is provided with a hollow, spherical-ended portion 439 through which passes a rod 440 having a head 441 for limiting relative axial movement between the rod 440 and the link 437. The opposite end of the rod 440 is seated within a bearing 442 in a brake block 443. The rod 440 is provided with a nut 44 for pre-setting the effective length to the rod 40. The brake block 443 is adapted to cooperate with a gib strap 445 which maintains a gib 446 in proper adjusted position against the one bearing surface of the way 59. A pressure transmitting element 447 is provided in the brake block 443 and extends through the gib strap 445 to effectively cooperate with the gib 446 in binding the head H to the column C.

Referring to Fig. 23, the piston 434 is in its right-hand position by virtue of liquid under constant pressure being admitted to the cylinder 435 from a duct 448. Thus, the link 437 is in its extended position thereby effectively drawing the bar 440 in a manner to effect a clamping action between the brake block 443, and the gib 446 through the pressure transmitting element 447, effectively binding the head H to the column C. Admission of liquid under pressure to the side of the piston 434 opposite that connected to the rod 436 through the line 449, causes the piston 434 to move (Fig. 23) in a manner to actuate the rod 440 to thereby release the clamping action between the brake block 443 and the gib 446. The line 448 and its corresponding line for the binder 432 are adapted continuously to be supplied with liquid under pressure while the line 449 and the corresponding line for the binder 432 are adapted to be supplied with liquid under pressure upon the energization of a solenoid valve 450 (Figs. 1 and 24) which is substantially identical with the solenoid valve 399 (Fig. 22).

Referring to Figs. 5 and 24, the line 162 is adapted to be supplied at all times with liquid under pressure from duct 448′; whereas, the line 161 is adapted to be supplied with liquid under pressure upon the energization of a solenoid valve 451 that acts in the same manner as the solenoid valve 450. Additionally, referring to Figs. 8 and 24, the line 102 is adapted to be supplied with liquid under pressure at all times when the solenoid 452 is deenergized. Accordingly, piston 100 is normally in its left-most position locking gear 99 to stationary member 103. Upon the energization of the solenoid mechanism 452, the liquid in line 102 is exhausted, permitting the rotation of gear 99 and the rattling of the teeth between gear 99 and member 103. The solenoid mechanism 452 is substantially the same as solenoid mechanism 399 of Fig. 22, except that there is no passage in the solenoid mechanism 452 corresponding to the passage 403 in the solenoid mechanism 399.

Figure 25:
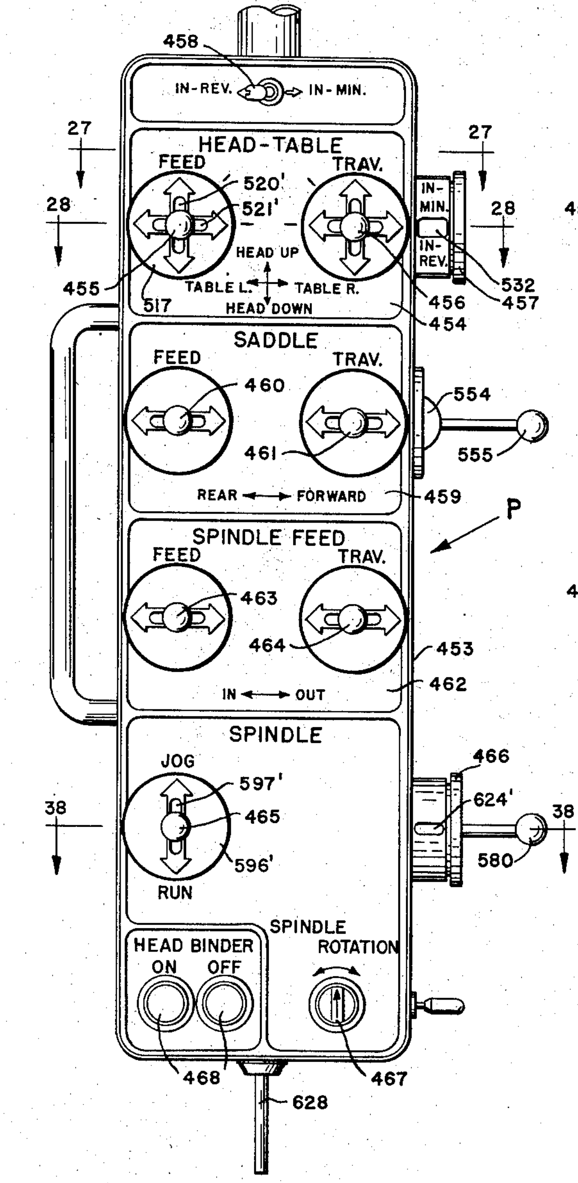
Fig. 25 is a view of the pendant P shown in Fig. 1.
Figure 26:
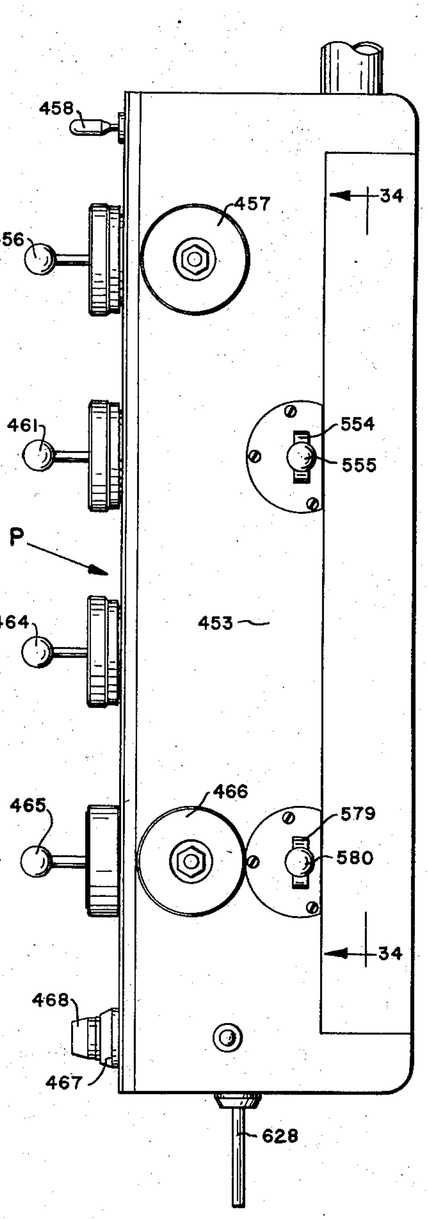
Fig. 26 is a side view of the pendant shown in Fig. 25.

All of the solenoid valves shown in Figs. 19 and 24 with the exception of valve 452 are adapted selectively to be energized and de-energized from the pendant P (Fig. 1), more clearly shown in Figs. 25 and 26. Referring to Figs. 25 and 26, the pendant P comprises an elongated body member 453 having a substantially rectangular cross section and providing a plurality of compartments in each of which are located various hand-operated controls for the horizontal boring mill. The upper compartment 454 of the housing 453 includes pivotally mounted levers 455 and 456 for directionally controlling the movement of the head H and the table T at feed and traverse rates of motion, respectively. Since the head H only moves vertically, the vertical movement of the levers 455 and 456 effects the corresponding motion of the head H. Additionally, since the table T is adapted to be moved in a horizontal plane from left to right when an operator is standing adjacent the pendant P and looking toward the table T and rear post P′, the left- and right-movements of the levers 455 and 456 are adapted to control the corresponding directions of motion of the table T. Also associated with the compartment 454 is a knurled knob 457 for pre-setting the rate of feed of the feedworks F in either inches per revolution or inches per minute, depending upon whether the switch 458 (Fig. 25) is in the left- or right-hand position.

The body member 453 also includes a compartment 459 in which pivotally mounted levers 460 and 461 are located. These levers function substantially in the same way that the levers 455 and 456 function, but since the saddle S (Fig. 1), which they are adapted to control, moves only in a horizontal plane, there is no need for moving these levers in a vertical direction. An additional compartment 462 is provided within the body member 453 and it includes pivotally mounted levers 463 and 464 adapted to control the feed and traverse movements of the spindle S′ (Fig. 1). As previously described, the spindle S′ moves only in a horizontal plane and, therefore, the pivotally mounted levers 463 and 464 function in an identical manner as the levers 460 and 461.

The bottom compartment of the body member 453 is provided with a single pivotally mounted lever 465 that is adapted to control the rotation of the spindle S'. The lever 465 also is arranged to be moved in a vertical plane in one direction to provide a jogging motion of the spindle S' and in the other direction to cause the spindle to rotate continuously. The lower compartment of the body member 453 also has a knurled knob 466 associated with it for controlling the rate of rotation of the spindle S'. The knurled knob 466 functions somewhat similarly to the knurled knob 457 for setting up the various speeds of rotation of the spindle S'. The lower compartment of the housing 453 also includes a switch 467 for controlling the direction of rotation of the spindle S'; as well as a pair of switches 468 for controlling the binder (Fig. 23) associated with the head H.

Figures 27, 28:
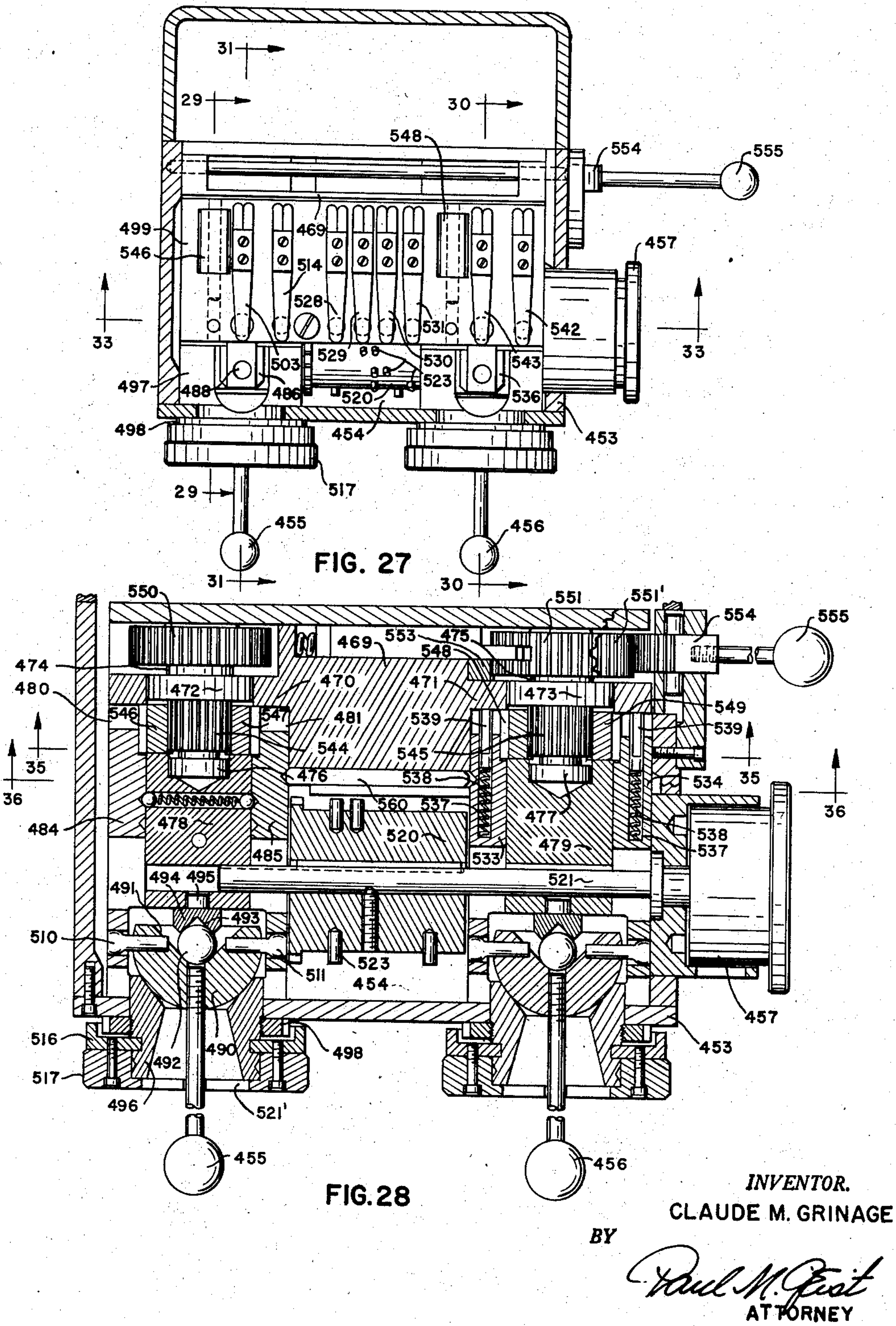
Fig. 27 is a sectional plan view taken substantially along line 27—27 of Fig. 25.
Fig. 28 is a sectional plan view taken substantially along line 28—28 of Fig. 25.
Figures 29, 30, 31, 32:
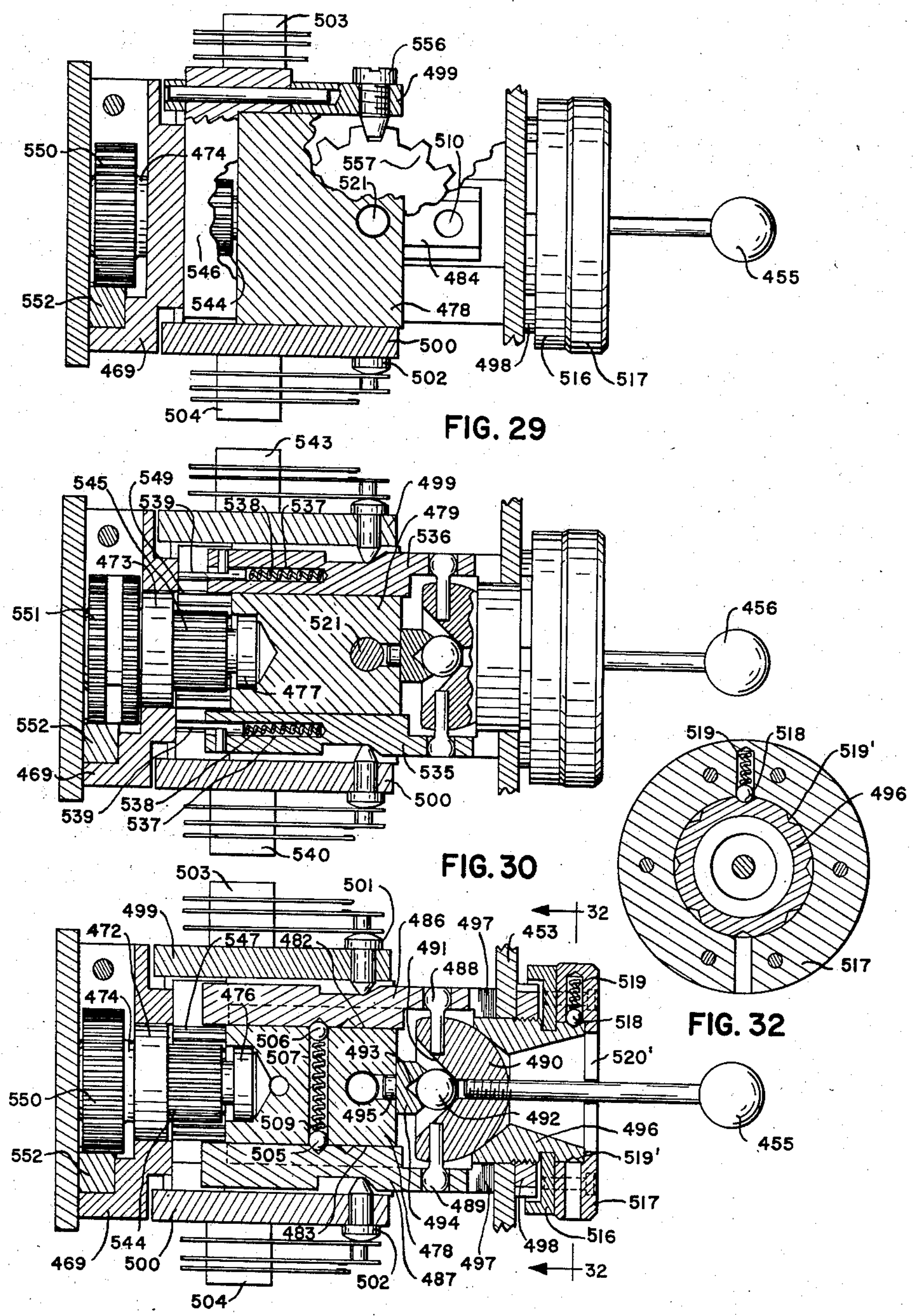
Fig. 29 is a sectional elevational view taken substantially along line 29—29 of Fig. 27.
Fig. 30 is a sectional elevational view taken substantially along line 30—30 of Fig. 27.
Fig. 31 is a sectional elevational view taken substantially along line 31—31 of Fig. 27.
Fig. 32 is a sectional elevational view taken substantially along line 32—32 of Fig. 31.

Referring to Figs. 25, 27, 28, 30 and 31, and particularly to Fig. 28, the compartment 454 is provided with a rectangularly shaped plate 469 having a central portion substantially thicker than side portions or ears 470 and 471. Bearings 472 and 473, respectively, are provided in the ears 470, 471 and they support shafts 474 and 475, respectively. Additional bearings 476 and 477 for the shafts 474 and 475 are received within identical block-like elements 478 and 479. Since these elements are substantially identical, only the block element 478 will be specifically described.It includes four ways 480 and 481 (Fig. 28); and 482 and 483 (Fig. 31). The relationship of the ways 480, 481, 482 and 483 can best be seen in Fig. 33.

Figure 33:
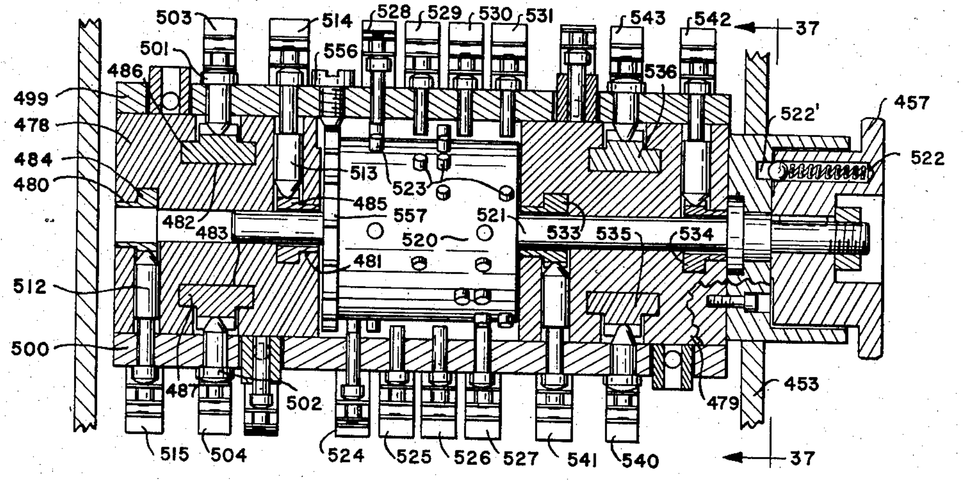
Fig. 33 is a sectional elevational view taken substantially along line 33—33 of Fig. 27.

Referring to Figs. 31 and 33, cam members 484, 485, 486 and 487 are slidably located within the four ways 480, 481, 482 and 483, respectively. The cams 486 and 487 are identical and are provided with transverse cross sections of T-shape adapted to be received within the ways 482 and 483. They include forward end portions having openings therein (Fig. 31) for the reception of spherical ends of pins 488 and 489 that are mounted within and extend from the spherical surface of an element 490 of substantially semi-spherical form. The element 490 is provided with a conical recess 491 adapted to receive a ball 492 which latter cooperates with a conical recess 493 within an abutment element 494 having a stud 495 that is mounted within a recess in the one face of the element 478. The spherical member 490 is maintained in position such that the ball 492 is tightly held between the two surfaces of the conical recesses 491 and 493 by a collar 496 having ears 497 that are adapted to abut against the inner wall of the housing 453. A nut 498 is threaded onto the collar 496 against the outer surface of the housing 453 to rigidly lock the assembly together. The lever 455 (Figs. 25, 31) is threaded into the spherical member 490 and the construction and arrangement of the parts is such that vertical movement of the lever 455 upwardly causes the cam 486 to move leftwardly (Fig. 31) and the cam 487 to move rightwardly. Plate members 499 and 500 are mounted on the top and bottom of the assembly. These plate members extend throughout the length of the unit assembly within the top compartment 454 and are adapted to support actuating pins 501 and 502 (Fig. 31) that extend through the plate and cooperate with the cams 486 and 487. Switches 503 and 504 are also mounted on the plates 499 and 500, respectively. The switch 503 is connected to the solenoid 322 (Figs. 15, 20) which when energized causes the rod 309 to move rightwardly and with it the clutch 201', thereby effecting the upward feeding movement of the head H at a rate depending upon the pre-set condition of structure to be described later. Movement of the hand lever 455 vertically downwardly (Fig. 31) causes the cam 487 to force the pin 502 downwardly thereby closing the switch 504. The switch 504 is wired into an electrical circuit including the solenoid 322' (Fig. 20) which when energized effects the leftward movement of the piston rod 310 together with the rod 309 (Fig. 15) thereby causing the clutch 201' to move leftwardly (Fig. 15) to effect the downward feeding of the head H at a rate to be described later. In order to retain the pivotal lever 455 in either of its vertically-upward or vertically-downward positions until positively moved therefrom, balls 505 and 506 are located within a drilled passage 507 within the member 478. A spring 509 is located between the balls 505 and 506 thereby urging them outwardly into cooperating engagement with notches within the cams 486 and 487.

Referring to Fig. 28, the member 490 is also provided with pins 510 and 511 having spherical ends that extend into openings within the forward ends of cams 484 and 485. The cams 484 and 485 are somewhat similar to cams 486 and 487, and their transverse cross-sectional form can be seen in Fig. 33. Referring to Fig. 33, the plates 499 and 500 also support pins 512 and 513 that extend inwardly of the member 478 and cooperate with the cams 484 and 485. Also mounted on the plates 499 and 500 are switches 514 and 515. The switch 514 is electrically connected to the solenoid 357 (Fig. 16) which when energized causes rightward movement of the rod 350, thereby moving the clutch 197' rightwardly to effect rightward feeding motion of the table T (towards the back of the machine when facing the machine in the vicinity of the pendant). Additionally, the switch 515 is within an electrical circuit including the solenoid 357' (Fig. 16) which when energized effects the leftward movement of the clutch 197' and the consequent leftward feeding movement of the table T.

Referring to Fig. 31, a rotatable disc 516 is mounted on the collar 496. It is fixed to a detent disc 517 that is provided with a ball 518 and a spring 519 for registering with prelocated depressions 519' (Fig. 32) within the periphery of the collar 496. The disc 516 and the detent mechanism 517 are provided with right-angularly disposed slots 520' and 521' (Fig. 25) for guiding the lever 455 in its pivotal movement. With the apparatus in the condition shown in Fig. 25, leftward movement of the pivotal lever 455 causes the table T to move leftwardly; movement of the lever 455 rightwardly causes the table T to move rightwardly; movement of the lever 455 upwardly causes the head H to move upwardly; and movement of the lever 455 downwardly causes the head H to move downwardly. Referring to Fig. 32, the recesses 519' permit locating the detent disc 517 such that slots 520' and 521' (Fig. 25) are at a 45° angle relatively to the horizontal and vertical. This permits pivotal lever 455 to be moved at a 45° angle in each quadrant, thereby directionally effecting simultaneous movement of the head H and table T. All of these movements of the head H and table T are at a feed rate depending upon the pre-set position of a rotatable drum 520 (Fig. 33) that is located between the members 478 and 479 and journalled in each by a shaft 521. The shaft 521 extends outwardly beyond the housing 453 and has keyed to it the knurled knob 457. A spring detent 522 cooperates with a plurality of recesses 522' located about a supporting member for the shaft 521 within the housing 453. The drum 520 is provided with a plurality of dogs 523 predeterminedly located about the periphery of the drum. These dogs are adapted to cooperate with switches 524 to 531, inclusive, mounted on the plates 499 and 500. The switch 527 is electrically connected to the solenoid valve 369 (Fig. 17) and specifically, to the coil 376' thereof (Fig. 21). As previously described, energization of the coil 376' by the closing of the switch 527 causes the stem 376 to move downwardly, thereby effecting the leftward movement of the piston rod 363 and, consequently, the clutch-shifting finger 361, whereupon the gears 186 and 178 become enmeshed. The switch 526 is connected into an electrical circuit including the coil 382 of the solenoid valve 369 which latter, upon energization as previously described, causes the rightward movement of the piston rod 363 and the corresponding movement of the clutch finger 361 thereby effecting engagement between the gears 186 and 180. The switches 525 and 524 are connected into electrical circuits including the coils of solenoid valve 370 (Fig. 17) which when selectively energized cause the shifting of the clutch-shifting finger 365 leftwardly and rightwardly in the same way that the solenoid valve 369 controls the movement of the clutch-shifting finger 361.

Figure 18:
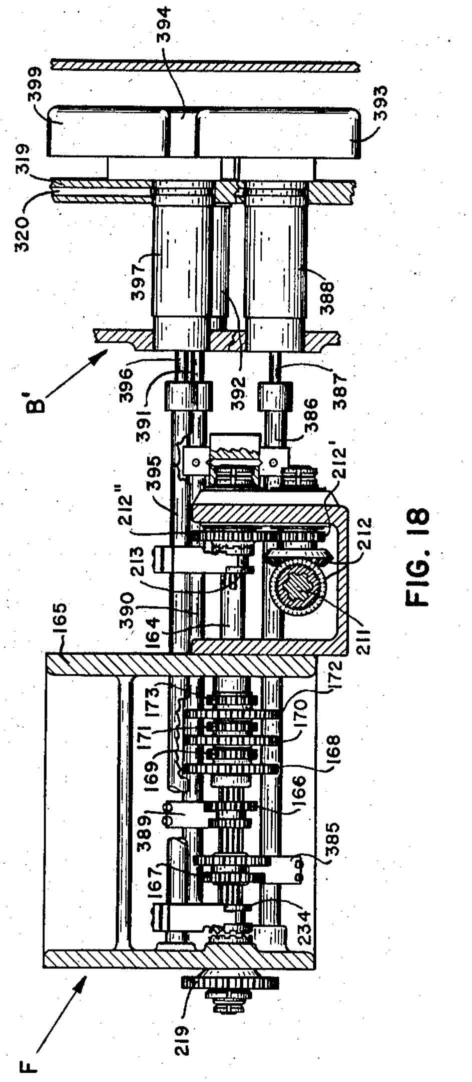
Fig. 18 is a sectional plan view taken substantially along line 18—18 of Fig. 4.

In a like manner, the electrical switches 528, 529, 530 and 531 are each connected into separate electrical circuits including solenoid valves 393 and 394 for controlling the shifting of the clutch-shifting fingers 385 and 389 (Fig. 18). Accordingly, by selectively locating the dogs 523 on the drum 520, any one of 16 different rates of feed motion can be established in the feed-works F by merely rotating the knurled knob 457 which is calibrated and viewable through a window 532 adjacent the knurled knob 457 (Fig. 25). From the foregoing description, it is evident that a pre-selected one of 16 rates of feed motion may be set up by turning the knurled knob 457, and movement of the pivotal lever 455 will control the movement of the head H and table T.

Referring again to Fig. 33, the member 479 includes substantially the identical parts described in connection with the member 478; however, since the lever 456 that cooperates with member 479 is employed to provide traverse movement of the head and table, certain differences are necessary in the construction of the member 479. Referring to Figs. 28 and 30, cam members 533, 534, 535 and 536 are provided with longitudinally bored openings 537 within each of which are located a compression spring 538 and a plunger 539 that force each of the cam members 533 to 536, inclusive, to a position neutralizing the pivotal lever 456. This is necessary since it is desirable to effect the traverse motion of the head and table only while the operator manually holds the pivotal lever 456 in effective position. Upon release thereof, lever 456 automatically returns to a neutral position.

Referring to Fig. 33, the plates 499 and 500 also support four additional switches 540, 541, 542 and 543. These switches are adapted to be closed in the same manner as the switches 503, 504, 514 and 515 are closed by the movement of the pivotal lever 455. The switch 540 is connected into an electrical circuit including a solenoid valve 321′ which when energized causes the draw bar 306 (Fig. 15) to move leftwardly thereby moving the clutch 231′ leftwardly and effecting downward traverse movement of the head H and rear post P′. The electrical switch 543 is in a circuit including solenoid 321 which when energized causes draw bar 306 to be moved rightwardly (Fig. 15) thereby causing the clutch 231′ to move in a rightward direction thereby effecting the upward traverse motion of the head H and rear post P′.

The switch 541 is electrically connected to the solenoid 358′ (Fig. 16) which when energized causes the draw bar 349 to be moved letwardly thereby effecting the leftward movement of the clutch 230′ causing the table T to be moved leftwardly at a traverse rate. Additionally, the switch 542 is connected into a circuit including the solenoid 358 which when energized causes the draw bar 349 to move rightwardly together with the clutch 230′ thereby effecting the rightward traverse motion of the table T. From the foregoing, it is evident that movement of the pivotal lever 456 leftwardly (Fig. 25) will cause the table T to move leftwardly at a traverse rate; movement of the lever 456 rightwardly will cause the table T to move rightwardly at a traverse rate; movement of the lever 456 upwardly will cause the head H and rear post head 296 to move upwardly at a traverse rate; and movement of the lever 456 downwardly will cause the head H and rear post head 296 to move downwardly at a traverse rate. Upon the release of the lever 456, the same will immediately return to its neutral position to thereby effect stopping of either the head and rear post or the table, depending upon which one has been moving at a traverse rate.

Referring to Fig. 25, the compartment 459 of the housing 453 includes apparatus identical to that shown and described in connection with the compartment 454 except that certain parts have been omitted inasmuch as the apparatus within compartment 459 is adapted to control movement of the saddle S which moves only in a horizontal plane. Accordingly, provision is made for the movement of the pivotal levers 460 and 461 only in a horizontal direction. Consequently, that portion of the apparatus within compartment 454 which is employed in connection with the vertical movement of the levers 455 and 456 is omitted in the apparatus contained within the compartment 459. Movement of the pivotal lever 460 rightwardly will close PSFF switch (Fig. 41, line 42) that energizes the solenoid 359 (Figs. 16 and 19), thereby moving the draw bar 352 rightwardly together with the clutch 197 and consequently effecting the movement of the saddle S rightwardly or forwardly toward column C (Fig. 1) at a feed rate depending upon the pre-set condition of the knurled knob 457 (Fig. 25). Further references to Fig. 41 will be made by a numeral in parentheses will refer to the horizontal line in the wiring diagram of Fig. 41. Movement of the pivotal lever 460 leftwardly closes PSFR switch (43) energizing the solenoid 359′ thereby causing the draw bar 352 (Fig. 16) to be moved leftwardly together with the clutch 197 whereupon saddle S moves leftwardly or rearwardly from column C at a feed rate depending upon the pre-set condition of the knurled knob 457.

Movement of the pivotal lever 461 rightwardly closes PSTF switch (44) energizing the solenoid 360 thereby effecting the rightward movement of the draw bar 351 and the clutch 230 whereupon the saddle S is caused to move rightwardly or forwardly toward column C at a traverse rate. Release of the pivotal lever 461 causes it to be returned to its neutral position in the same way that the pivotal lever 456 is caused to be returned to the neutral position upon its release. Movement of the pivotal lever 461 leftwardly closes PSTR switch (45) energizing the solenoid 360′ thereby causing the leftward movement of the draw bar 351 and the clutch 230 (Fig. 16) to effect the leftward or rearward movement of the saddle S at a traverse rate.

The mechanism within the compartment 462 (Fig. 25) is identical with the mechanism within the compartment 459 and includes the pivotal levers 463 and 464 for controlling the feed and traverse movements of the spindle S′ (Fig. 1). Leftward movement of the pivotal lever 463 closes PBFO switch (47) energizing the solenoid 323 thereby effecting the rightward movement of the draw bar 311 (Fig. 15) and the clutch 201 to effect outward movement of the spindle S′ (Fig. 1), at a feed rate depending upon the pre-set condition of the knurled knob 457 (Fig. 25). Movement of the pivotal lever 463 to the right closes PBFI switch (46) energizing the solenoid 323′ thereby moving the draw bar 311 (Fig. 15) leftwardly and together with it the clutch 201 to effect inward movement of the spindle S′, and at a feed rate depending upon the pre-set condition of the knurled knob 457.

Movement of the pivotal lever 464 to the left closes PBTO switch (49) energizing the solenoid 324 (Fig. 15) thereby causing the draw bar 313 and the clutch 231 to move rightwardly, whereupon the spindle S′ is moved outwardly at a relatively rapid traverse rate; and, movement of the pivotal lever 464 to the right (Fig. 25) closes PBTI switch (48) energizing the solenoid 324′ thereby effecting the leftward movement of the draw bar 313 together with the clutch 231 whereupon the spindle S′ is moved inwardly at a rapid traverse rate.

Figure 35:
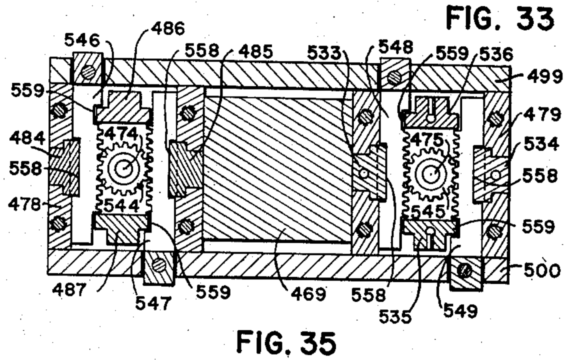
Fig. 35 is a sectional elevational view taken substantially along line 35—35 of Fig. 28.
Figure 34:
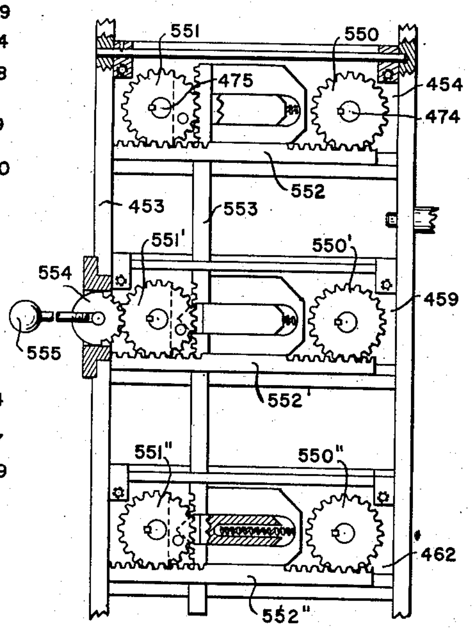
Fig. 34 is a sectional elevational view taken substantially along line 34—34 of Fig. 26.
Figure 37:
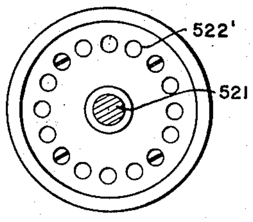
Fig. 37 is a sectional view taken substantially along line 37—37 of Fig. 33.

The various feed and traverse pivotal levers 455, 456, 460, 461, 463 and 464, as well as the knurled knob 457, which elements control the feed and traverse movements of the head H, the spindle S', the saddle S, the table T and the rear post head 296, are interlocked in a manner to prevent unintentional operation of any of these movable members. Referring to Figs. 33 to 36, the interlocking mechanism also includes means for preventing the repeated opening and closing of the various electrical switches while making a pre-selection of the feed rate of movement of the movable members. Accordingly, each of the plates 499 and 500 within the compartments 454, 459 and 462 (Fig. 25) is adapted to be moved together with the various switches mounted thereon out of cooperating position with respect to their actuating cams 484, etc., or dogs 523 on the drum 520. Referring to Fig. 28, the shafts 474 and 475 are provided with spur gears 544 and 545, respectively, that mesh with racks 546, 547; and 548, 549, respectively (Fig. 35). The racks 546 and 548 are connected to the plate 499, while the racks 547 and 549 are connected to the plate 500. Accordingly, clockwise rotation of the spur gears 544 and 545 (Fig. 35) will cause the plates 499 and 500 to move away from each other together with the switches and switch-actuating plungers mounted thereon. The shafts 474 and 475 are also provided with spur gears 550 and 551 (Fig. 34). The shafts within the compartments 459 and 462 that correspond to the shafts 474 and 475 within compartment 454 likewise have mounted thereon spur gears 550', 551', 550'' and 551'', respectively. Racks 552, 552', and 552'' are mounted within the respective compartments 454, 459 and 462 and each meshes with its corresponding spur gear 550, 551; 550', 551'; and 550'', 551''. A common rack member 553 extends vertically between the various compartments and also meshes with the gears 551, 551', and 551''. A gear segment 554 pivotally mounted in the wall of the housing 453 is provided with a hand lever 555. The construction and arrangement of the parts are such that upward movement of the hand lever 555 causes the clockwise motion of the gears 550, 551; 550', 551'; and 550'', 551''. Accordingly, the plates 499 and 500 within each of the compartments 454, 459 and 462 are moved away from each other, thereby moving all of the switches and switch-actuating plungers mounted thereon away from their corresponding cams and actuating dogs. Returning the hand lever 555 to its horizontal positions returns the plates 499 and 500 to their condition as shown in Fig. 33.

In order to prevent the rotation of the handle 457 to select a new rate of feed movement when the machine is conditioned to effect a movement of one of the movable members, the plate 499 within the compartment 454 is provided with a set screw 556 (Figs. 29 and 33) that cooperates with a toothed wheel 557 fixed to the drum 520. The set screw 556 prevents the rotation of the drum 520 except when the plates 499 and 500 are in their separated position at which time all movement effecting switches on said plates are open. In order to prevent the plates 499 and 500 in each of the compartments being inadvertently separated, each of the racks 546, 547, 548 and 549 (Fig. 35) is provided with notches 558 and 559 that cooperate with the cams 484, 485, 486 and 487 as well as the corresponding cams within the member 479. Accordingly, movement of any one of the pivotal levers 455, 456, 460, 461, 463 and 464 (Fig. 25) will effect the corresponding movement of one of the previously referred to cams, whereupon an abutment on the cam that was moved will cooperate with one of the notches 558 and 559 in one of the racks 546, 547, 548 or 549 to prevent its movement. Since all of the racks 546, 547, 548 and 549 in compartments 454, 459 and 462 are positively geared together as well as to hand lever 555, it follows that said hand lever cannot be moved and, consequently, the plates 499 and 500 in all of the compartments cannot be moved.

Figure 36:
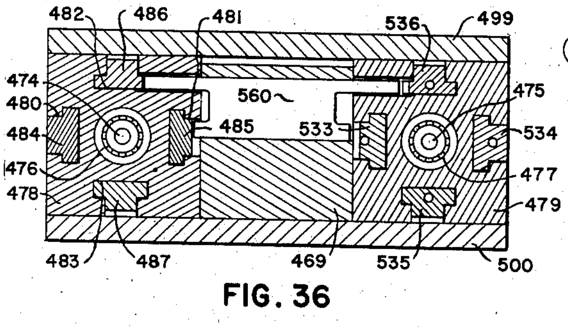
Fig. 36 is a sectional elevational view taken substantially along line 36—36 of Fig. 28.

In order to prevent the movement of any one of the levers 455, 460 and 463 when levers 456, 461 and 464 are in their active positions, or vice versa, an interlock is provided in each of the compartments 454, 459 and 462, only the one in the compartment 454 being shown. Referring to Fig. 36, the interlock includes a slidable element 560 having extended arms at the ends of which are teeth adapted to cooperate with intermeshing teeth on the cams 486 and 485 on the one hand, and with teeth on the corresponding cams within the member 479 on the other hand. The overall length of the arms of the member 560 is such that when the teeth on the arms cooperate with the teeth on cams 486 and 485, the corresponding cams in the member 479 may be moved, and, conversely, when the teeth on the arms of the member 560 cooperate with the cams within the member 479, cams 486 and 485 can be moved. Accordingly, movement of any one of the levers 455, 460 and 463 into a feed position for its corresponding movable member will prevent the movement of any one of the levers 456, 461 and 464. Likewise, with the levers 456, 461 and 464 in an operative position, the above described interlocking system prevents the movement of any one of the corresponding pivotal levers 455, 460 and 463.

Figures 38, 39, 40:
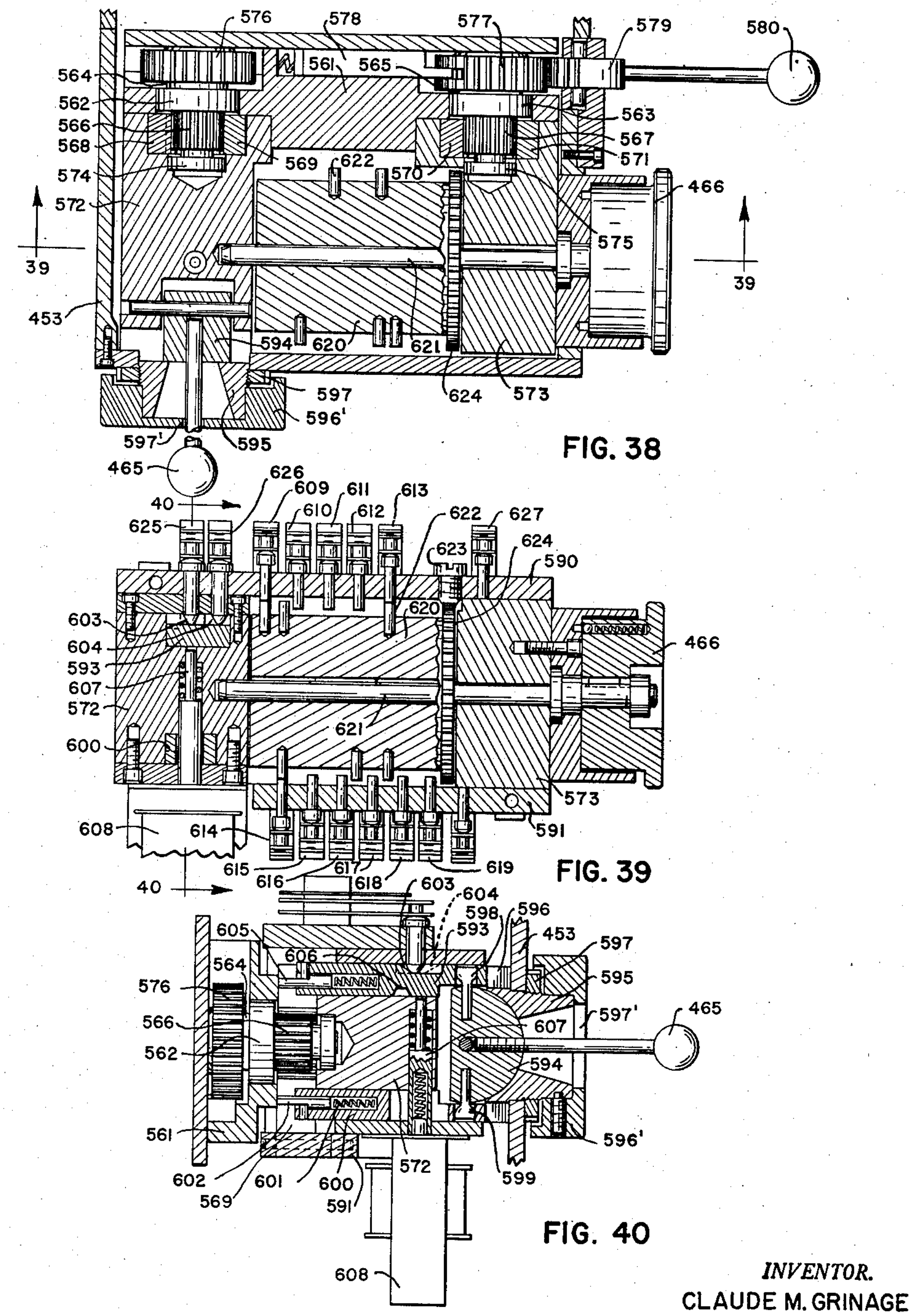
Fig. 38 is a sectional plan view taken substantially along line 38—38 of Fig. 25.
Fig. 39 is a sectional elevational view taken substantially along line 39—39 of Fig. 38.
Fig. 40 is a sectional view taken substantially along line 40—40 of Fig. 39.

Referring to Figs. 38, 39 and 40, the mechanism for controlling the rotation of the spindle S' within the lower compartment of the housing 453 includes a bracket 561 (Fig. 38) having ears supporting bearings 562 and 563 for a pair of shafts 564 and 565. Spur gears 566 and 567 fixed to shafts 564 and 565, respectively, mesh with racks 568, 569; and 570, 571. Cam supporting blocks 572 and 573 are mounted within the lower compartment of the housing 453 and are provided with bearings 574 and 575 for supporting the shafts 564 and 565. The racks 568 and 569 are adapted to be reciprocated within slots formed within the member 572; and, the racks 570 and 571 are adapted to be reciprocated within slots formed in the member 573. Gears 576 and 577 are also mounted on the shafts 564 and 565, and a rack 578 is mounted between, and in meshing relation with them. A hand lever 580 is attached to a gear segment 579 that is mounted within the wall of the housing 453 of the pendant P. Referring to Fig. 39, the plates 590 and 591 are mounted at the top and bottom of the assembly within the lower compartment, and these plates are connected to the racks 568, 569, 570 and 571 in the same maner as the plates 499 and 500 are attached to the racks shown in Fig. 35. The plates 590 and 591 are adapted to support a plurality of switches to be described later which are adapted to cooperate with various cams and dogs on a drum, also to be described later, all in somewhat the same manner as the switches shown in Fig. 33 are adapted to cooperate with the cams and dogs also shown therein. Accordingly, movement of the pivotal lever 580 upwardly (Fig. 25) causes the gears 577 and 576 to be partially rotated thereby partially rotating the gears 566 and 567, consequently moving the racks 568, 569, 570 and 571 to thereby effect the separation of the plates 590 and 591. Accordingly, the switches mounted on said plates are moved out of cooperating relationship with the various cams and dogs shown in Fig. 39.

Referring to Figs. 39 and 40, the member 572 is provided with a slot adapted to slidingly receive a cam 593. A semi-cylindrical plate 594 is mounted within the lower compartment of the housing 453 and is held there by a mating element 595 having ears 596 that engage the inside surface of the wall of the housing 453. A nut 597 is threaded onto the outer surface of the member 595 and into engagement with the outer surface of the wall of the housing 453. A collar 596' fixed to the member 595 is provided with a slot 597' (Fig. 25) to confine the motion of the hand lever 465 only in a vertical direction. Extending outwardly from the member 594 along a diameter thereof are two actuators 598 and 599. The actuator 598 is provided with a spherical end portion adapted to engage in a slot within the one end of the cam 593 as shown in Fig. 40. The outer end of the actuator 599 similarly engages a reciprocable member 600 having a compression spring 601 mounted therein that is adapted to actuate a plunger 602. The construction and arrangement of the latter being to normally urge the hand lever 465 into its neutral position when displaced therefrom in a downward direction. The cam 593 is provided with two cam surfaces 603 and 604 (Fig. 39). These cam surfaces are inclined in opposite directions as shown in Fig. 40 wherein the solid line shows the inclination of cam 603 and the dotted line shows the inclination of cam 604. The cam 593 is also provided with a spring pressed detent 605 for urging the cam 593 and the lever 465 into a neutral position. When the lever 465 is moved downwardly to effect a feeding motion as distinguished from a jog motion of the spindle S', it is desirable that the lever 465 stay down in its active position during the operation against the action of spring pressed detent 602 which normally tends to return lever 465 to its neutral position. Accordingly, a notch 606 is provided in the cam 593 and it is adapted to cooperate with a spring pressed detent 607 that is urged downwardly of the member 572, but adapted to be moved upwardly (Fig. 40) by the energization of a solenoid 608.

Referring to Fig. 39, the cover plate 590 is provided with electrical switches 609, 610, 611, 612 and 613, and plate 591 is provided with electrical switches 614, 615, 616, 617, 618 and 619.

Referring to Figs. 4, 5, 22, 24 and 39, the electrical switch 613 is connected into the circuit for the coil 451' of the solenoid valve 451. The solenoid valve 451 is similar to that shown in Fig. 22. Line 162 (Figs. 24 and 5) is supplied with pressure liquid from line 448' thereby causing the piston 159 to move rightwardly to effect the engagement between the teeth 149 and 150. Closing the switch 613 energizes the coil 451' of the solenoid 451 to cause liquid to be admitted through line 161 (Fig. 5) thereby moving the piston 159 leftwardly and effecting the engagement of gears 156 and 157.

The electrical switch 609 (Fig. 39) is electrically connected in a circuit with the coil 429' of the solenoid valve 429 (Figs. 4 and 19) which is identical with the solenoid valve shown in Fig. 21. Accordingly, closing the switch 609 energizes the coil 429', thereby effecting the leftward movement of the draw bar 424 and, consequently, the engagement of clutch 137 with the spur gear 136. The electrical switch 610 (Fig. 39) is connected in the circuit with the coil 429'' of the solenoid valve 429 which when energized causes the rightward movement of the draw bar 424 and the consequent engagement of the clutch 137 with the gear 135.

The electrical switch 611 is connected into the circuit of the coil 430' which when energized causes the draw bar 426 to move leftwardly (Fig. 4) thereby effecting the engagement of the clutch 131 with the gear 128. The electrical switch 612 is connected into the circuit with the coil 430'' of the solenoid valve 430 which when energized effects the rightward movement of the draw bar 426 (Fig. 4) and the consequent engagement of the clutch 131 with the gear 129.

The electrical switch 614 is connected into the circuit of the coil 422'' (Fig. 19) of the solenoid valve 422 which when energized causes the rightward movement of the draw bar 415 and, consequently, the movement of the clutch 123 into engagement wtih the gear 122. The switch 615 (Figs. 39 and 41) is connected into a circuit including the coil 422' of the solenoid valve 422 (Fig. 19) which when energized effects the leftward movement of the draw bar 415 and the consequent engagement between the clutch 123 and the gear 121 (Fig. 4).

The electrical switch 616 (Figs. 39 and 41) is connected into a circuit including the coil 423'' (Fig. 19) of the solenoid valve 423 which when energized effects the rightward movement of the draw bar 418 (Fig. 4) thereby effecting engagement between the clutch 112 and the gear 109. The electrical switch 617 is connected into an electrical circuit including the coil 421'' of the solenoid valve 421 (Fig. 19) which when energized effects the rightward movement of the draw bar 412 and the consequent engagement between the clutch 118 and the gear 117. The electrical switch 618 (Figs. 39 and 41) is connected into the circuit including the coil 423' which when energized effects movement of rod 419 leftwardly which causes clutch 112 to engage gear 110. The electrical switch 619 (Figs. 39 and 41) is connected into the circuit including the coil 421' which when energized effects the leftward movement of the draw bar 412 and the consequent engagement between the clutch 118 and the gear 116 (Fig. 4). From the foregoing, it is evident that selectively closing the electrical switches 609 to 619 (Fig. 39) can effect the selection of any one of 36 rates of rotation of the spindle S'.

Referring to Fig. 39, a drum 620 is mounted on a shaft 621 that is journaled in the members 572 and 573. The drum 620 is adapted to be provided with switch actuating dogs 622 selectively located around the periphery of the drum 620 so that rotation of the drum to any one of 36 different positions about its periphery can effect a predetermined rate of rotation of the spindle S'. The shaft 621 extends outwardly from the housing 453 and has fixed to it the knurled disc 466. In order to prevent the changing of the adjustment of the drum 620 when a pre-selected speed has been established for the spindle S', the plate 590 is provided with a set screw 623 that is adapted to cooperate with teeth on the periphery of a gear 624 that is fixed to the shaft 621. Accordingly, with the plates 590 and 591 in their retracted or closed positions such that the dogs 622 on the drum 620 render the various switches effective, the knurled disc 466 cannot be rotated. However, separation of the plates 590 and 591 by the operation of the pivotal lever 580 (Fig. 25) will permit the rotation of the knurled disc 466 to select any one of 36 different rates of rotation of the spindle S'. Referring to Fig. 25, a window 624' is located within the stationary element on the mechanism supporting the disc 466, and it indicates the preselected speed for any given adjustment of the knurled disc 466.

The plate 590 (Fig. 39) also includes an electrical switch 625 containing two contacts (Fig. 41), PS1 (12) which is normally open and PS2 (13) which is normally closed. An electrical switch 626 is also mounted on the plate 590 and it includes a contact PJ (16) of Fig. 41. An additional electrical switch 627 is located on the plate 590 and it contains a normally open contact PHID–1 (15) of Fig. 41.

Referring to Fig. 41, the main motor for driving the V-pulley 105 (Fig. 4) contains a series of normally open switches F and a series of normally open switches R within its circuit. With the switch 467 (Fig. 25) turned to the forward direction, the contact PTF (6) is closed and the contact PTR (8) is open. With the pivotal lever 465 (Fig. 25) in its central or neutral position, switch PS2 (13) is closed. Accordingly, TR1 solenoid (13) and CR2 solenoid (14) are energized. Energization of CR2 solenoid (14) closes the CR2–2 switch (11). Movement of the pivotal lever 465 downwardly causes closing of the PS1 switch (12) and the opening of PS2 switch (13). However, TR1 solenoid and CR2 solenoid (13 and 14) remain energized, since the CR2 switch (14) has been closed by the energization of the CR2 solenoid (14). Additionally, closing of the TR1 switch (12) energizes the IS solenoid 608 (12) which causes the detent 607 (Fig. 40) to move upwardly and to cooperate with the notch 606 to lock the cam 593 in its rightward position. The cam 593 in its rightward position effects the closing and opening of switches PS1 and PS2, respectively, as previously described. Furthermore, closing of the PS1 switch (12) causes current to flow through the SPCR relay (11) energizing it and causing SPCR switch (6) to close and SPCR switch (18) to open. Closing of the SPCR switch (6) causes current to flow through the F solenoid (6) whereupon the F contacts in the main motor circuit are closed, thereby causing the main motor to rotate in a forward direction and, consequently, to rotate the spindle S′ in a forward direction depending upon the pre-set condition of the drum 620 (Fig. 39). Since the SPCR switch (18) has been opened, no current flows to the magnetic brake mechanism BM (20). The only way to effect stopping of the main motor and to return the lever 465 to its neutral position is to open the normally closed PS3 switch (14) and identified in Fig. 25 as 628. Manually opening the PS3 switch (14) de-energizes TR1 relay (13) and CR2 relay (14). Deenergization of the CR2 relay (14) causes opening of the CR2–2 switch (11) thereby de-energizing the SPCR relay (11) and consequently opening the SPCR switch (6). Accordingly, the F solenoid (6) becomes de-energized, thus opening the F switches within the circuit of the main motor. De-energization of the CR2 relay (14) also effects closing of the CR2 switch (18), and since the SPCR switch (18) has closed by virtue of the previous de-energization of SPCR relay (11), the magnetic brake BM for the main motor is energized causing the latter to stop. However, it is to be noted that the lever 465 cannot be moved manually to its neutral position because it remains locked by the solenoid 608 (12). De-energization of the TR1 relay (13) causes a delayed opening of the TR1 switch (12) whereupon the solenoid 608 (12) becomes de-energized and the detent 607 (Fig. 40) is retracted whereupon the spring detent 602 returns the lever 465 to its neutral position. The delayed opening of the TR1 switch (12) causes the delayed closing of the PS2 switch (13) which latter causes the CR2 relay (14) to become re-energized and thereby to cause opening of the CR2 switch (18). However, the timing pre-set on the TR1 relay (13) is so set that closing of the PS2 switch (13) will not occur until after the main motor has stopped rotating in a forward direction.

From the foregoing, it is evident that the spindle S′ can be rotated in a forward direction at any one of 36 different speeds pre-set by the operation of the knurled disc 466 (Fig. 25) by simply moving the pivotal lever 465 downwardly (Fig. 25). In a like manner, the same conditions prevail if the switch 467 is turned in a manner to produce reverse rotation of the main motor. The above is believed to describe the circuit in Fig. 41 sufficiently to make it unnecessary to repeat the description relatively to the R solenoid (8) as distinguished from the F solenoid (6).

Referring to Figs. 18, 22 and 25, with the switch 458 in the position shown indicating that the apparatus is in condition for producing feed movements in inches per revolution, the solenoid 399 is de-energized and the piston within cylinder 397 is in its rightward position. Consequently, the clutch 213 (Fig. 18) is in engagement with the gear 212″. As previously described, this effects a feeding motion in inches per revolution of the spindle S′. Movement of the switch 458 (Fig. 25) to its right-hand position energizes the coil 407 of the solenoid valve 399 thereby causing the stem 400 to move downwardly against the action of the spring 406 so that the draw bar 395 is moved leftwardly, thereby causing the clutch 234 to engage the gear 219 whereupon the spindle S′ is rotated at the rate of inches per minute. Accordingly, any predetermined feed rate in inches per minute or inches per revolution may be set by adjusting the knurled knob 457 as previously described. With the main motor rotating in either a forward or reverse direction as previously described, movement of the pivotal levers 455, 460 or 463 will effect the directional feeding movement of the head H, the table T, the saddle S or the spindle S′ at the rate predetermined by the setting of the knurled knob 457.

Furthermore, with the main motor running as previously described, and without regard to a predetermined setting of the knurled disc 466 for a given headstock combination of gears, the head H, the table T, the saddle S and the spindle S′ may be directionally traversed by moving the corresponding traverse levers 456, 461 and 464. It often becomes desirable to traverse the various movable members of the horizontal boring mill while the spindle S′ is not rotating. This is possible with the present invention for the following reasons. Movement of the pivotal lever 580 upwardly, of course, separates the plates 590 and 591 (Fig. 39) thereby de-energizing all of the solenoids that are controlled by the switches on these plates and, consequently, neutralizing all of the clutches within the headstock. However, this action effects the closing of normally open switch 627 (15) (Fig. 41) which energizes TR2 relay (15) and CR3 relay (16). Energizing TR2 relay closes TR2 switch (17) thereby energizing CR4 relay (17). Accordingly, CR4 switch (23) is opened and CR4 switch (19) is closed. Energizing CR3 relay (16) closes CR3 switch (10) whereupon SPCR relay (11) is energized which effects the closing of SPCR switch (6) thereby energizing F solenoid (6), assuming that the switch 467 (Fig. 25) is turned to close its forward direction contact 467 (6). Energization of the F relay (6) closes the F switches within the main motor circuit thereby causing the main motor to rotate in a forward direction. Accordingly, any traverse or feed in inches per minute can then be effected directionally by the directional movement of the levers 455, 456, 460, 461, 463 and 464, at which time all of the headstock clutches are neutralized so that the spindle S′ is not rotating. Movement of the hand lever 580 to the position where the plates 590 and 591 are closed, causes switch 627 (15) to open, de-energizing TR2 relay (15) and CR3 relay (16). De-energization of CR3 relay (16) opens CR3 switch (10) thereby de-energizing SPCR relay (11) which effects the opening of SPCR switch (6) and the consequent de-energization of the F relay (6) which latter stops the main motor. Additionally, de-energization of the SPCR relay (11) effects the closing of SPCR switch (18) and since CR4 switch (19) is still closed as will be described later, the brake BM (20) becomes effective to stop the main motor.

De-energization of the TR2 relay (15) causes a delayed opening of TR2 switch (17) and, consequently, the delayed energization of the CR4 relay (17). This in turn causes a delayed closing of the CR4 switches (23 and 12) and the delayed opening of the CR4 switch (19) until such time as the brake has completely stopped the main motor. Since the CR4 switch (12) is delayed in closing, nothing happens if the lever 465 is inadvertently moved downwardly before the former's closing. This ensures the stopping of the main motor before a re-selection of headstock gears can be made which might otherwise cause clashing of gear teeth. Due to the time delay of relay TR1 (13), the main motor will have stopped prior to the closing of the plates 590 and 591; the closing of PS2 switch (13); the re-energization of CR2 relay (14); and the subsequent opening of CR2 switch (18). Such an arrangement is necessary in order to permit re-setting of the brake apparatus for subsequent operations.

Although the various features of the new and improved machine tool have been shown and described in detail to fully disclose one embodiment of the invention, it will be evident that numerous changes may be made in such details, and certain features may be used without others without departing from the principles of the invention.

What is claimed is:

1. In a horizontal boring mill, a base; a column attached to said base; a head mounted on said column for vertical movement therealong; a spindle mounted in said head for rotation as well as axial feed and traverse movement; a combined headstock and feedworks transmission, integrally united and located within said column; driving connections between said transmission and said spindle and head; shiftable clutches and gear clusters within said transmission for establishing different gear ratios therein; clutch and gear cluster shifting rods for all of said clutches and gear clusters arranged parallel to each other; a removable bracket attached to the rear of said transmission and including a separate hydraulically actuated piston and cylinder mechanism for each of said shifting rods; connectors between each of said rods and its corresponding piston rod; a manifold plate attached to said bracket and adapted to support the one end of each of said cylinders; means within said manifold plate for continuously supplying all of said cylinders with liquid under pressure; and solenoid-operated valves connected to said manifold plate for controlling the flow of liquid to selected sides of the pistons within said cylinders.

2. In a horizontal boring mill, a base; a column attached to said base; a head mounted on said column for vertical movement therealong; a spindle mounted in said head for rotation as well as axial feed and traverse movement; a combined headstock and feedworks transmission, integrally united and located within said column; driving connections between said transmission and said spindle and head; shiftable clutches and gear clusters within said transmission for establishing different gear ratios therein; clutch and gear cluster shifting rods for all of said clutches and gear clusters arranged parallel to each other; a removable bracket attached to the rear of said transmission and including a separate, hydraulically actuated piston and cylinder mechanism for each of said shifting rods; connectors between each of said rods and its corresponding piston rod; a manifold plate attached to said bracket and adapted to support one end of each of said cylinders; means within said manifold plate for continuously supplying all of said cylinders with liquid under pressure; solenoid-operated valves connected to said manifold plate for controlling the flow of liquid to selected sides of the pistons within said cylinders; and means for selectively energizing said solenoid-operated valves.

3. In a horizontal boring mill, a base; a column attached to said base; a head mounted on said column for vertical movement therealong; a spindle mounted in said head for rotation as well as axial feed and traverse movement; a headstock located within said column and comprising an input shaft; a back shaft parallel with and geared to said input shaft; an intermediate shaft coaxial with said input shaft; an output shaft parallel with said intermediate shaft; intermeshing gears between said back shaft, intermediate shaft and output shaft; positive action clutches between certain of the gears on said back shaft and output shaft; a vertically disposed shaft connected to said output shaft and extending vertically upwardly into said head; a high- and low-speed gearing arrangement within said head and adapted to be supplied with power by said vertically disposed shaft; a feedworks transmission mounted on top of and integrally connected to said headstock transmission and located within said column; shiftable clutches and gear clusters within said headstock and feedworks transmissions for establishing different gear ratios therein; clutch and gear cluster shifting rods for all of said clutches and gear clusters arranged parallel to each other; a removable bracket attached to the rear of said transmissions and including a separate hydraulically actuated piston and cylinder mechanism for each of said shiftable rods; connectors between each of said rods and its corresponding piston rod; a manifold plate attached to said bracket and adapted to support the one end of each of said cylinders; means within said manifold plate for continuously supplying all of said cylinders with liquid under pressure; and solenoid-operated valves connected to said manifold plate for controlling the flow of liquid to selected sides of the pistons within said cylinders.

4. In a horizontal boring mill, a base; a column attached to said base; a head mounted on said column for vertical movement therealong; a spindle mounted in said head for rotation as well as axial feed and traverse movement; a combined headstock and feedworks transmission; driving connections between said transmission and said head; shiftable clutches and gear clusters within said transmission for establishing different gear ratios therein; clutch and gear cluster shifting rods for all of said clutches; a bracket attached to the rear of said transmission and including a separate hydraulically actuated piston and cylinder mechanism for each of said shiftable rods; and solenoid-operated valves connected to a manifold plate for controlling the flow of liquid to selected sides of the pistons within said cylinders.

5. In a horizontal boring mill, a base; a column attached to said base; a head mounted on said column for vertical movement therealong; a spindle mounted in said head; a saddle mounted on said base; a table mounted on said saddle; a rear post mounted on said base; a rear post head mounted on said rear post for vertical movement therealong; a combined headstock and feedworks transmission located within said column; driving connections between said headstock and spindle, between said headstock and feedworks, and between said feedworks and head, saddle, table and rear post head; shiftable clutches and gear clusters within said transmission for establishing different gear ratios therein; clutch and gear cluster shifting rods for all of said clutches and gear clusters arranged parallel to each other; a removable bracket attached to the rear of said transmission and including separate hydraulically actuated piston and cylinder mechanisms for each of said shiftable rods; a manifold plate attached to said bracket and adapted to support the one end of each of said cylinders; means within said manifold plate for continuously supplying all of said cylinders with liquid under pressure; solenoid-operated valves connected to said manifold plate for controlling the flow of liquid to selected sides of the pistons within said cylinders; a tubular conduit leading from said manifold plate to a position in convenient access to the operator; a pendant connected to the end of said conduit opposite that near said manifold plate; electrical conductors within said conduit extending from said solenoid-operated valves to said pendant; and switches within said pendant for controlling the operation of said solenoid valves.

6. In a horizontal boring mill, a base; a column attached to said base; a head mounted on said column for vertical movement therealong; a spindle mounted in said head; a saddle mounted on said base; a table mounted on said saddle; a rear post mounted on said base; a rear post head mounted on said rear post for vertical movement therealong; a combined headstock and feedworks transmission located within said column; driving connections between said headstock and spindle, between said headstock and feedworks, and between said feedworks and head, saddle, table and rear post head; shiftable clutches and gear clusters within said transmission for establishing different gear ratios therein; separate hydraulically-actuated piston and cylinder mechanisms for each of said shiftable clutches and gear clusters; solenoid-operated valves for controlling the flow of liquid to selected sides of the pistons within said cylinders; a tubular conduit leading from said transmission to a position in convenient access to the operator; a pendant connected to the end of said conduit opposite that near said transmission; electrical conductors within said conduit extending from said solenoid-operated valves to said pendant; and switches within said pendant for controlling the operation of said solenoid valves.

7. A pendant for a machine tool comprising in combination, a housing; a rotatable shaft in said housing;

switch-operating dogs fixed to and rotatable with said shaft; a plurality of switches within said housing; means within said housing for supporting said switches; means for moving said supporting means in a rectilinear path from a position where said switches cooperate with said dogs to a position where said switches are unaffected by said dogs; and means between said rotatable shaft and said supporting means for preventing the rotation of said shaft until said supporting means are moved to a position where said switches are unaffected by said dogs.

8. A pendant for a machine tool comprising in combination, a housing; a rotatable shaft within said housing; switch-operating dogs fixed to and rotatable with said shaft; a plurality of switches within said housing; plate means within said housing for supporting said switches, said plates being arranged in parallel spaced relation; oppositely facing rack means fixed to each of said plates; common gear means between said racks whereby rotation of said gear means causes said rack means to move rectilinearly in opposite directions, thereby moving said switch-supporting means from a position where said switches cooperate with said dogs to a position where said switches are unaffected by said dogs; and means between said rotatable shaft and said supporting means for preventing the rotation of said shaft until said supporting means are moved to a position where said switches are unaffected by said dogs.

9. A pendant for a machine tool comprising in combination, a housing; a rotatable shaft within said housing; switch-operating dogs fixed to and rotatable with said shaft; a plurality of compartments within said pendant; a plurality of switches within each of said compartments; means within each of said compartments for supporting said switches; common means for all of said compartments for moving the switch-supporting means therein from a position where said switches are adapted to be rendered effective to a position where said switches are inoperable; and means between said rotatable shaft and said common means for preventing the rotation of said shaft until the supporting means in all of said compartments are moved to a position where the switches therein are in inoperable position.

10. A pendant for a machine tool comprising in combination, a housing; a rotatable shaft within said housing; switch-operating dogs fixed to and rotatable with said shaft; a plurality of compartments within said housing; a plurality of switches in one of said compartments adapted to be operated by the switch operating dogs on said rotatable shaft; a plurality of switches in the other of said compartments; means within each of said compartments for supporting the switches therein comprising in each instance a pair of parallel disposed plates; oppositely facing rack elements in each of said compartments fixed to separate of said plate means; gear means in meshing relation with each set of oppositely disposed rack means, whereupon rotation of said gear means causes separation of said rack means to thereby separate the corresponding plate means attached thereto; common means between all of said compartments for simultaneously rotating the gear means in each of said compartments; and means between said rotatable shaft and the supporting means in one of said compartments for preventing the rotation of said shaft until all of the plate supporting means in all of said compartments are moved to a position where the switches supported thereby are in inoperable position.

11. In a horizontal boring mill having a base, a column fixed to said base, a head vertically movable along said column, and a table movable transversely of said base; a pendant including a housing; two sets of four switches each within said housing; a plurality of additional switches located within said housing between said two sets of four switches; a rotatable shaft extending into said housing; a drum fixed to said shaft and located between said two sets of four switches and adapted to support switch-operating means for actuating the additional switches located between the two sets of four switches; pivotally-mounted operating fingers extending outwardly from said housing; linkages between said fingers and their corresponding sets of four switches for causing the movement of said head and table in accordance with the direction in which said pivotal levers are moved; and means for preventing the movement of either pivotal lever when the other is in an active position.

12. In a horizontal boring mill having a base, a column fixed to said base, a head vertically movable along said column, a saddle movable longitudinally along said base, and a table movable transversely of said base on said saddle; a pendant for said mill including a housing; two sets of four switches each within a compartment of said housing; a plurality of additional switches located within said housing between said two sets of four switches; a rotatable shaft extending into said housing; a drum fixed to said shaft and located between said two sets of four switches and adapted to support switch-operating means for actuating the additional switches located between the two sets of four switches; pivotally-mounted operating fingers extending outwardly from said compartment; linkages between said fingers and said corresponding sets of four switches for causing the movement of said head and table in accordance with the direction in which said pivotal levers are moved; two sets of two switches each in another compartment of said housing; pivotally-mounted operating fingers extending outwardly from said last-mentioned compartment; linkages between said last-mentioned fingers and their corresponding sets of two switches for causing the movement of said saddle in accordance with the direction in which said last-mentioned pivotal fingers are moved; and means for preventing the movement of either pivotal finger within its corresponding compartment when the other in said compartment is in an active position.

13. In a horizontal boring mill having a base, a column fixed to said base, a head vertically movable along said column, a saddle movable longitudinally along said base, a table movable transversely of said base on said saddle, and a spindle axially movable within said head; a pendant for said mill including a housing; two sets of four switches each within a compartment of said housing; a plurality of additional switches located within said housing between said two sets of four switches; a rotatable shaft extending into said housing; a drum fixed to said shaft and located between said two sets of four switches and adapted to support switch-operating means for actuating the additional switches located between the two sets of four switches; pivotally-mounted operating fingers extending outwardly from said compartment; linkages between said fingers and said corresponding sets of four switches for causing the movement of said head and table in accordance with the direction in which said pivotal fingers are moved; two sets of two switches each in a second compartment of said housing; pivotally-mounted operating fingers extending outwardly from said second compartment; linkages between the fingers in said second compartment and their corresponding sets of two switches for causing the movement of said saddle in accordance with the direction in which said pivotal fingers are moved; two sets of two switches each in a third compartment of said housing; pivotally-mounted operating fingers extending outwardly from said third compartment; linkages between the fingers extending from said third compartment and their corresponding sets of two switches for causing the movement of said spindle in accordance with the direction in which said pivotal fingers are moved; and means for preventing the movement of either pivotal finger within any compartment when the other finger in said compartment is in an active position.

14. In a horizontal boring mill having a base, a column fixed to said base, a head vertically movable along said column, a rotatable spindle mounted in said head adapted to be axially moved, a saddle movable longitudinally along said base, and a table movable transversely of said base on said saddle; a pendant for said horizontal boring mill including a housing; two sets of four switches each within a compartment of said housing; a plurality of additional switches located within said housing between said two sets of four switches; a rotatable shaft extending into said housing; a drum fixed to said shaft and located between said two sets of four switches and adapted to support switch-operating means for actuating the additional switches located between the two sets of four switches; pivotally-mounted operating fingers extending outwardly from said compartment; linkages between said fingers and said corresponding sets of four switches for causing the movement of said head and table in accordance with the direction in which said pivotal fingers are moved; two sets of two switches each in a second compartment of said housing; pivotally-mounted operating fingers extending outwardly from said second compartment; linkages between said last-mentioned fingers and their corresponding sets of two switches for causing the movement of said saddle in accordance with the direction in which the pivotal fingers within said second compartment are moved; two additional sets of two switches each in a third compartment of said housing; pivotally-mounted operating fingers extending outwardly from said third compartment; linkages between the fingers within said third compartment and their corresponding sets of two switches for causing the axial movement of said spindle in accordance with the direction in which the pivotal fingers are moved; an additional set of two switches in a fourth compartment of said housing; a rotatable shaft extending into said fourth compartment; a drum fixed to said shaft and located to the one side of said set of two switches, and adapted to support switch-operating means for additional switches located within said fourth compartment; a pivotally-mounted operating finger extending outwardly from said fourth compartment; a linkage between the finger within said fourth compartment for causing the continuous and jogging movement of said rotatable spindle within said head when said pivotal finger is actuated; and means for preventing the movement of either of the pivotal fingers within the first three compartments when the other finger within said compartment is in an active position.

15. A pendant for a horizontal boring mill of the type having a head, a table, and a feedworks transmission therefor, comprising in combination, a housing; a rotatable shaft in said housing; switch-operating dogs fixed to and rotatable with said shaft; a plurality of switches within said housing adapted when selectively energized to cause said feedworks to operate at a preselected feed rate; four additional switches within said housing which when energized effect the movement of said head or table in either direction along said paths of motion at said preselected feed rate of said feedworks; means within said housing for supporting said plurality of switches; means for rotating said shaft to effect the energization of selected of said plurality of switches; a pivotally-mounted operating finger extending outwardly from said housing; a linkage between said finger and said four additional switches for causing the proper switch to be energized to effect the movement of the head or table in a direction in which said pivotal finger is moved; rack and gear means for moving said switch-supporting means between positions where said plurality of switches cooperate and do not cooperate with said switch-actuating dogs; and means responsive to the movement of said pivotal finger for preventing the actuation of said rack and gear means until said pivotal finger is in a neutral position.

16. A pendant for a horizontal boring mill of the type having a head, a table, and a feedworks transmission therefor, comprising in combination, a housing; a rotatable shaft in said housing; switch-operating dogs fixed to and rotatable with said shaft; a plurality of switches within said housing adapted when selectively energized to cause said feedworks to operate at a preselected feed rate; four additional switches within said housing which when energized effect the movement of said head or table in either direction along said paths of motion at said preselected feed rate of said feedworks; means within said housing for supporting said plurality of switches; means for rotating said shaft to effect the energization of selected of said plurality of switches; a pivotally-mounted operating finger extending outwardly from said housing; a linkage between said finger and said four additional switches for causing the proper switch to be energized to effect the movement of the head or table in a direction in which said pivotal finger is moved; rack and gear means for moving said switch-supporting means between positions where said plurality of switches cooperate and do not cooperate with said switch-actuating dogs; means on said switch-supporting means for preventing the rotation of said shaft when said switch-supporting means is in position where said plurality of switches cooperate with said switch-actuating dogs; and means reponsive to the movement of said pivotal finger for preventing the actuation of said rack and gear means until said pivotal finger is in a neutral position.

17. A pendant for a machine tool having a feedworks transmission, a tool support and a work support, comprising in combination, a housing; a rotatable shaft within said housing; switch-operating dogs fixed to and rotatable with said shaft; a plurality of switches within said housing, and adapted when energized selectively to cause a predetermined feed rate to be established within the feedworks of said machine tool; two sets of four switches each in addition to said plurality of switches within said housing, between which sets the switch-operating dogs on said shaft are located, said last-mentioned sets of four switches each being adapted when selectively energized to cause relative movement between the tool support and work support in either direction along two intersecting paths at a rapid traverse rate, and at a predetermined feed rate established in said feedworks; separate pivotally-mounted operating fingers extending outwardly from said housing for said traverse and feed control; and linkages between each finger and its corresponding set of four switches for causing the proper switch to be energized to effect said relative movement between said tool support and said work support in the direction in which a selected of said pivotal fingers is moved, and at a traverse or feed rate depending upon the finger selected.

18. A pendant for a horizontal boring mill having a feedworks transmission, a base, a column attached to said base, a head vertically reciprocable along said column, and a table longitudinally movable along said base, said pendant comprising a housing; a rotatable shaft within said housing; switch-operating dogs fixed to and rotatable with said shaft; a plurality of switches within said housing, adapted when selectively energized to cause a predetermined feed rate to be established within said feedworks of said horizontal boring mill; two sets of four switches each in addition to said plurality of switches in said housing, and between which sets said switch-operating dogs are located, said last-mentioned sets of four switches each adapted when selectively energized to cause the movement of the head and table along their respective paths of motion, and at a rapid traverse rate or a predetermined feed rate established in said feedworks; separate pivotally-mounted operating fingers extending outwardly from said housing for said traverse and feed controls; and linkages between each finger and its corresponding set of four switches for causing the proper switch to be energized to effect movement of said head or table in the direction in which a selected of said pivotal fingers is moved, and at a traverse or feed rate depending upon the finger selected.

19. A pendant for a machine tool having a feedworks transmission, a tool support and a work support, comprising in combination, a housing; a rotatable shaft within said housing; switch-operating dogs fixed to and rotatable with said shaft; a plurality of switches within said housing adapted when selectively energized to cause a predetermined feed rate to be established within said feedworks; two sets of four switches each in addition to said plurality of switches in said housing and between which sets of switches said switch-operating dogs are located, said sets of four switches being adapted when energized to cause relative movement between said tool support and work support in either direction along their respective paths at a rapid traverse rate and at a predetermined feed rate established in said feedworks; means within said housing for supporting all of said switches; rack and gear means for moving said supporting means from a position where said plurality of switches cooperates with said dogs to a position where said plurality of switches are unaffected by said dogs; means between said rotatable shaft and said supporting means for preventing the rotation of said shaft until said supporting means has been moved to a position where said switches are unaffected by said dogs; separate pivotally-mounted operating fingers extending outwardly from said housing for said traverse and feed controls; and linkages between each of said fingers and its corresponding set of four switches for causing the proper switch to be energized to effect the relative movement between said tool support and work support in the direction and along the path depending upon the selected of said pivotal fingers being moved, and at a traverse or feed rate depending upon the finger selected.

20. A pendant for a horizontal boring mill having a feedworks transmission, a base, a column attached to said base, and a table longitudinally movable along said base, comprising in combination, a housing; a rotatable shaft within said housing; switch-operating dogs fixed to and rotatable with said shaft; a plurality of switches within said housing adapted when selectively energized to cause a predetermined feed rate to be established within the feedworks of said horizontal boring mill; two sets of four switches each in addition to said plurality of switches within said housing and between which is located said switch-operating dogs, said latter sets of four switches being adapted when energized to cause the movement of said head and table in either direction along their respective paths of motion at a rapid traverse rate and at a predetermined feed rate established in said feedworks; means within said housing for supporting all of said switches; rack and gear means for moving said supporting means from a position where said plurality of switches cooperates with said dogs to a position where said plurality of switches are unaffected by said dogs; means between said rotatable shaft and said supporting means for preventing the rotation of said shaft until said supporting means is moved to the position where the switches are unaffected by said dogs; separate pivotally-mounted operating fingers extending outwardly from said housing for said traverse and feed controls; and linkages between each of said fingers and its corresponding set of four switches for causing the proper switch to be energized to effect the movement of said head or table in the direction in which a selected of said pivotal fingers is moved, and at a traverse or feed rate depending upon the finger selected.

21. A pendant for a machine tool having a plurality of rectilinearly-movable members, and a feedworks therefor, comprising in combination, a housing; a plurality of compartments within said housing; a rotatable shaft in one of said compartments; switch-operating dogs fixed to and rotatable with said shaft; a plurality of switches within each of said compartments, certain of the switches within one of the compartments being located in cooperating relationship with said rotatable shaft; separate means within each of said compartments for supporting the switches therein; common means for simultaneously moving all of said switch-supporting means from a position where said certain switches in the one compartment cooperate with the dogs on the rotatable shaft, to a position where said certain switches are unaffected by said dogs; and means between said rotatable shaft and the switch-supporting means within the compartment containing said rotatable shaft for preventing the rotation of said shaft until said switch-supporting means is moved to a position where the switches thereon are unaffected by the dogs on said shaft.

22. A pendant for a horizontal boring mill of the type having a head, a table, a saddle and a spindle, each adapted to be moved along a rectilinear path of motion, comprising in combination, a housing; a plurality of compartments within said housing; a rotatable shaft in one of said compartments; switch-operating dogs fixed to and rotatable with said shaft; a plurality of switches within the compartment containing said shaft and in cooperating relationship therewith; a plurality of other switches within each of said compartments which when energized control the movement of said head, table, saddle and spindle; separate means within each of said compartments for supporting the switches therein; common means for simultaneously moving all of said supporting means from a position where the switches within the compartment containing said rotatable shaft are moved from a position where they cooperate with the dogs on said shaft, to a position where they are unaffected by said dogs; and means between said shaft and the corresponding switch-supporting means for preventing the rotation of said shaft until said corresponding switch-supporting means is moved to a position where the switches thereon are unaffected by the dogs on said shaft.

23. A pendant for a machine tool having a plurality of movable members, each adapted individually to be moved along a rectilinear path of motion, comprising in combination, a housing; a set of switches within said housing for each of said movable members, which switches, when energized, effect the movement of the corresponding member in either direction along its path of motion; a pivotally-mounted operating finger extending outwardly from said housing for each of said sets of switches; rectilinearly-movable switch-supporting means within said housing for each of said sets of switches; a linkage between each finger and its associated switches for causing the proper switch to be energized to effect the movement of the corresponding member in the direction, and along its path of motion in accordance with the directional movement of said finger; and rack and gear means within said housing for moving said switch-supporting means from a position of activity to a position of inactivity.

24. A pendant for a horizontal boring mill of the type having a head, a table, a saddle, a spindle and a feedworks transmission therefor, comprising in combination, a housing; a separate set of switches within said housing for said head, table, saddle and spindle, which switches when energized effect the movement of the corresponding member in either direction along its path of motion; a pivotally-mounted finger extending outwardly from said housing for each separate set of switches; linkage between each finger and its corresponding set of switches; a shaft extending into said housing and provided with a plurality of switch-actuating dogs; another set of switches located within said housing in position to cooperate with said switch-actuating dogs; rectilinearly-movable means within said housing for supporting each set of switches, as well as said additional switches; means common to all of said supporting means for moving them from a position where the switches thereon are in an active position to a location where said switches are inactive; and means for preventing the operation of any of said pivotally-mounted fingers when said supporting means are in positions where the switches thereon are ineffective.

25. A pendant for a horizontal boring mill having a head, a table, a saddle, and a spindle, each adapted to be moved at a feed or traverse rate along its respective path of motion, comprising in combination, a housing; two sets of four switches each within a compartment of said housing for said head and table; a rotatable shaft extending into the said compartment and provided with a plurality of switch-actuating dogs located thereon, said switch-actuating dogs being located between the two sets of four switches each within said compartment; an additional set of switches within said compartment in cooperating position relatively to said switch-actuating dogs; two sets of two switches each in each of two other compartments within said housing, all of said sets of switches being adapted when energized to cause the movment of the corresponding head, table, saddle or spindle at a relatively rapid traverse rate or at a preselected feed rate, the latter being dependent upon the cooperation between said switch-actuating dogs and said additional switches; separate pivotally-mounted operating fingers extending outwardly from said housing for said traverse and feed controls for each said head, table, saddle and spindle; and a linkage between each finger and its corresponding set of switches for causing the proper switch to be energized to effect movement of the corresponding head, table, saddle or spindle, in the direction corresponding to the direction of movement of a selected pivotal finger and at a traverse or feed rate depending upon the finger selected.

26. A pendant for a horizontal boring mill of the type having a head, a table and a feedworks transmission therefor, comprising in combination, a housing; a rotatable shaft in said housing; switch-operating dogs fixed to and rotatable with said shaft; a plurality of switches within said housing adapted when selectively energized by said switch-operating dogs to cause said feedworks to operate at a preselected feed rate; four additional switches within said housing which when energized effect the movement of said head or table in either direction along said paths of motion at said preselected feed rate of said feedworks; means within said housing for supporting said plurality of switches; means for rotating said shaft to effect the energization of selected of said plurality of said switches; a pivotally-mounted operating finger extending outwardly from said housing; a linkage between said finger and said four additional switches for causing the proper switch to be energized to effect the movement of said head or table in the direction in which said pivotal finger is moved; rack and gear means for moving said switch-supporting means between positions where said plurality of switches cooperate and do not cooperate with said switch-actuating dogs; and means responsive to the actuation of said rack and gear means for preventing the movement of said pivotal finger from a neutral position.

27. In a horizontal boring mill having a head adapted to be reciprocated along a vertical path, and a table adapted to be reciprocated along a horizontal path; a control for said mill comprising in combination, a housing; a set of four switches within said housing, the separate energization of two of which effects the movement of said head in either direction along said vertical path, and the separate energization of the other two of which effects the movement of the table in either direction along said horizontal path; a pivotally-mounted finger extending outwardly from said housing; a guide for directing the movement of said finger in a direction parallel to said vertical path and said horizontal path; means for providing simultaneous movement of said head and said table along their respective paths, comprising means for turning said guide through 45° angles whereby to direct the movement of said finger along paths at 45° to that of the two intersecting paths of the head and table; and a linkage between said finger and said switches for causing the proper single switch to be energized to effect movement of said head or table in the direction in which said finger is moved, and the proper pair of switches to be energized to cause simultaneous movement of the head and table to produce a resultant relative movement in the direction in which said finger is moved.

28. In a horizontal boring mill having a head adapted to be reciprocated along a vertical path, a table adapted to be reciprocated along a horizontal path, and a feedworks for moving said head and table at a relatively rapid traverse rate and at a preselected feed rate along their respective paths of motion, comprising in combination, a housing; two sets of four switches each within said housing, the separate energization of two of which switches in each set effects the movement of said head in either direction along said vertical path and at a feed or traverse rate depending upon the switches that are energized, and the separate energization of the other two of which switches within each set effects the movement of the table in either direction along said horizontal path at a feed or traverse rate; pivotally-mounted fingers extending outwardly from said housing, one for controlling said traverse rate and the other for controlling said feed rate; guides for directing the movement of said fingers in a direction parallel to said vertical path and said horizontal path; means for providing simultaneous movement of said head and said table along their respective paths at a feed or traverse rate, comprising means for turning said guides through a 45° angle, thereby to effect the movement of said fingers along paths at 45° to that of the two intersecting paths of the head and table; and a linkage between said fingers and said switches for causing the proper single switch to be energized to effect movement of said head or table in either direction in which said fingers are moved, and the proper pair of switches to be energized to cause simultaneous movement of the head and table to produce a resultant relative movement in the direction in which said fingers are moved, and at a feed or traverse rate depending upon which finger is moved.

29. In a horizontal boring mill of the type including a base, a column, a head on said column, a saddle on said base, and a table on said saddle, a combined headstock and feedworks transmission mounted wholly within said column for controlling the feeding and traverse movement of said head, saddle and table; hydraulically-operated piston mechanisms for controlling the operation of said feedworks and headstock transmission; solenoid-operated valves for controlling the flow of liquid under pressure to selected sides of said piston and cylinder mechanisms; and a hydraulic system for said piston mechanisms separate from the lubricating system of said machine tool.

30. In a horizontal boring mill of the type having a base, a column attached to the base, a head mounted on the column for vertical reciprocation, and a table universally movable in a horizontal plane and mounted on said base, a combined headstock and feedworks transmission integrally united and located within said column; driving connections between said transmission and said head and table; a plurality of shiftable means within said transmission adapted when selectively shifted to cause said head and table to be moved relatively to each other; a unitary bracket attached to the rear of said transmission and including operating means for rendering effective said shiftable means within said transmission; solenoid means mounted on said bracket and adapted when energized to render effective said operating means; a conduit leading from said bracket to a position in convenient access to an operator; a pendant connected to the end of said conduit opposite that adjacent said bracket; conductors within said conduit connected to said solenoid means; and switches within said pendant connected to said conductors for selectively controlling the operation of said solenoid means.

31. A pendant for a machine tool of the type including means movable vertically and horizontally, comprising in combination, a housing; four switches within said housing arranged in sets of two each on vertically-spaced, parallel plates, one of the switches on the upper plate being adapted when energized to cause said means to move vertically upwardly, the other switch on said upper plate being adapted when energized to cause said means to move rightwardly in a horizontal plane, one of the switches on the lower plate adapted when energized to cause said means to move downwardly in a vertical plane, and the other switch on the lower plate being adapted when energized to cause said means to move leftwardly in a horizontal plane; a pivoted finger extending outwardly from said housing; four reciprocable cams arranged concentrically about a center and within a block located between said parallel plates; a universal connection between said pivoted finger and each of said cams, the construction and arrangement of the parts being such that pivotal movement of the finger in an upward direction causes one of the switches on the upper plate to be energized for effecting the upward movement of said means, movement of the pivoted finger to the right causes the closing of the other switch on the upper plate to effect rightward movement of the means, pivotal movement of the finger downwardly causes one of the switches on the lower plate to be closed, thereby effecting the downward movement of the means in a vertical plane, and movement of the pivotal finger to the left causes the other switch on the lower plate to be closed, thereby effecting leftward movement of the means.

32. A pendant for a horizontal boring mill of the type including a base, a column attached to said base, a head mounted on said column for vertical reciprocation, and a table mounted on said base for reciprocation along a path in a horizontal plane, comprising in combination, a housing; four switches within said housing arranged in sets of two on vertically-spaced, parallel plates, one of the switches on the upper plate being adapted when energized to cause said head to move upwardly, the other switch on said upper plate adapted when energized to cause said table to move toward said column, one of the switches on the lower plate being adapted when energized to cause said head to move downwardly, and the other switch on said lower plate being adapted when energized to cause the table to move away from said column; a pivoted finger extending outwardly from said housing; four reciprocable cam elements mounted within a block located between said parallel plates; universal connections between said pivoted finger and each of said four cam elements, the construction and arrangement of the parts being such that pivotal movement of the finger in an upward direction causes the one switch on said upper plate to be closed thereby effecting vertical upward movement of said head, the rightward movement of said pivotal finger causes the other switch on said upper plate to be closed thereby effecting the rightward movement of said table in a direction toward said column, pivotal movement of said finger downwardly causes one of the switches on the lower plate to be closed thereby effecting downward movement of said head, and leftward movement of said pivotal finger causes the other switch on said lower plate to be closed thereby effecting leftward movement of said table away from said column.

33. A pendant for a machine tool of the type including means movable vertically and horizontally, at a feed or traverse rate, comprising in combination, a housing; two sets of four switches each within said housing, each set including two switches arranged on vertically-spaced parallel arranged plates, two of the switches on the upper plate being adapted when energized to cause said means to move vertically and horizontally at a feed and traverse rate respectively, two of the switches of each set on the lower plate being adapted when energized to cause said means to move downwardly in a vertical plane and leftwardly in a horizontal plane at feed and traverse rates respectively; pivoted fingers, one for each set of four switches, extending outwardly from said housing; four reciprocable cam elements for each set of four switches arranged concentrically about a center within blocks between said parallel plates; universal connections between the respective pivoted fingers and their corresponding sets of four reciprocable cam elements, the construction and arrangement of the parts being such that pivotal movement of the fingers in an upward direction causes the closing of one switch of each of the sets of two switches on the upper parallel plate to thereby effect upward movement of the means at a feed or traverse rate depending upon the pivoted finger moved; movement of the pivoted fingers to the right causes closing of the other two switches of each set of two on the upper parallel plate thereby effecting the rightward movement of the means in a horizontal plane at either feed or traverse rate depending upon the pivoted finger moved; movement of the pivoted fingers downwardly causes closing of one of the switches in each set of two on the lower parallel plate to thereby effect the downward movement of the means in a vertical plane at either feed or traverse rate depending upon the pivoted finger moved; and leftward movement of the pivoted fingers causes closing of the other switches on the lower plate to thereby effect the leftward movement of the means at either feed or traverse rate depending upon the finger moved.

34. A pendant for a horizontal boring mill of the type including a base, a column, a head mounted on the column for vertical reciprocation, and a table mounted on the base for leftward and rightward movement toward and from said column, comprising in combination, a housing; two sets of four switches each within said housing, each set including two switches mounted on each of two parallel, vertically-spaced plates, two of the switches on the upper plate being adapted when energized to effect the upward movement of the head at either feed or traverse rate depending upon which switch is closed, the other two switches on the upper plate being adapted when energized to effect rightward movement of the table toward the column at either feed or traverse rate, two of the switches on the lower plate being adapted when energized to cause the head to move downwardly at either feed or traverse rate, and the other two switches on said lower plate being adapted when energized to cause movement of the table leftwardly away from the column; pivoted levers, one for each of said sets of four switches, extending outwardly from said housing; four concentrically-arranged reciprocable cam elements for each set of four switches mounted within blocks between said parallel plates; universal connections between each lever and its corresponding set of four reciprocable cam elements, the construction and arrangement of the parts being such that movement of the levers upwardly causes the closing of two of the switches on the upper plate to thereby effect upward movement of the head at either feed or traverse rate depending upon the lever moved, movement of the levers rightwardly causes closing of the other two switches on the upper plate thereby effecting the rightward movement of the table toward the column at either feed or traverse rate depending upon the lever moved, movement of the pivoted levers downwardly causes the closing of two of the switches on the lower plate thereby effecting the downward movement of the head at either feed or traverse rate depending upon the lever moved, and leftward movement of the levers causes the closing of the other two switches on the lower plate to thereby effect the movement of said table leftwardly away from said column.

35. A control for a machine tool including a housing; two sets of four switches each within said housing, adapted when energized to cause a movement of means along separate paths at a rapid traverse rate and at a predetermined feed rate; separate pivotally-mounted operating fingers extending outwardly from said housing for said traverse and feed controls; a set of four reciprocable cam elements arranged concentrically for each set of four switches; universal connections between each of said four cams and its corresponding pivotally-mounted finger; notches in two of the reciprocable cam elements for each set, the notches being adapted to be aligned in pairs when said pivotally-mounted fingers are in a neutral position; and a slidable bar having means adapted to cooperate with said notches to prevent the movement of either of said fingers when the other finger is out of the neutral position.

36. A horizontal boring mill of the type including a base, a column, a head mounted on said column for vertical reciprocation, a spindle mounted in said head for axial movement, a work-supporting table mounted on said base for universal movement in a horizontal plane, the combination comprising a headstock transmission including a plurality of shiftable clutches mounted within said column, rotatably connected to said spindle and adapted upon selective shifting of said clutches to effect rotation of said spindle at a plurality of speeds; a feedworks transmission including shiftable clutches mounted within said column and rigidly attached to and in driving relation with said headstock transmission and adapted, upon shifting of its clutches, to effect movement of said spindle, head, and table along their respective paths of motion at a plurality of feed speeds; a self-contained hydraulic system for said headstock and feedworks including piston means for shifting said clutches; a manifold means for supplying liquid under pressure to said piston means; solenoid valves for controlling the flow of liquid to and from said piston means; and means located in a convenient position for selectively energizing said solenoid valves.

37. A control for a transmission having a plurality of shiftable gear clusters comprising in combination, a plurality of solenoids adapted to be energized in various combinations to produce the various speeds obtainable with said transmission; a housing for said control; a rotatable shaft within said housing; switch-actuating dogs fixed to said shaft; a plurality of electrical switches, one for each of said solenoids located within said housing and located on opposite sides of the switch-actuating dogs on said shaft; rack and gear means for moving said switch supports from a position where said dogs actuate said switches, to a position where said dogs are ineffective; and means for preventing the turning of said rotatable shaft until said switch supports have been moved to the position where said dogs are ineffective.

38. A horizontal boring mill of the type including a base, a column attached to the base, a head mounted on said column for vertical reciprocation, and a table mounted on said base for universal movement in a horizontal plane, the combination comprising a headstock transmission located within said column; a feedworks transmission mounted on and fixed to said headstock transmission and extending upwardly in said column; driving connections between said headstock and a spindle mounted within said head; driving connections between said feedworks and said head, spindle and table; shiftable clutches and gear clusters within said headstock and feedworks transmission for establishing different gear ratios therein to provide different feed rates for said head, spindle and table, as well as different directions of motion thereof; clutch and gear cluster shifting rods for all of said clutches and gear clusters arranged in parallel relationship to each other; a removable bracket attached to the rear of said combined headstock and feedworks transmission and including separate, interchangeable, hydraulically-actuated piston and cylinder mechanisms and solenoid valves for each of the shifting rods that control the feed rates; and separate, interchangeable, hydraulically-actuated piston and cylinder mechanisms and solenoid valves for each of the shifting rods that control the direction of motion of said head, table and spindle.

39. In a horizontal boring mill, a base; a column attached to said base; a head mounted on said column for vertical movement therealong; a spindle mounted in said head; a saddle mounted on said base; a table mounted on said saddle; a rear post mounted on said base; a rear post head mounted on said rear post for vertical movement therealong; a combined headstock and feedworks transmission located within said column; driving connections between said headstock and spindle, between said headstock and feedworks, and between said feedworks and head, saddle, table and rear post head; shiftable clutches within said transmission; a bracket attached to said transmission and adapted to support fluid-actuated piston mechanisms for shifting the clutches within said transmission; solenoid-operated valves mounted on said bracket; a pendant located in convenient access to an operator adjacent said base; conductors extending from said pendant to the solenoid-operated valves on said bracket; and switches within said pendant for controlling the operation of said solenoid-operated valves.

40. In a horizontal boring mill, a base; a column attached to said base; a head mounted on said column for vertical movement therealong; a spindle mounted in said head; a saddle mounted on said base; a table mounted on said saddle; a rear post mounted on said base; a rear post head mounted on said rear post for vertical movement therealong; a headstock located solely within said column; a feedworks removably attached to the top of said headstock; driving connections between said headstock and said spindle, between said headstock and feedworks, and between said feedworks, head, saddle, table and rear post head; shiftable clutches and gear clusters within said headstock and feedworks; a bracket attached to said headstock and feedworks within said column; fluid-operated piston mechanisms mounted in said bracket and connected to said shiftable clutches and gear clusters within said headstock and feedworks; solenoid-operated valves mounted on said bracket and adapted to control the flow of fluid to said fluid-operated piston mechanisms; a pendant located in a convenient access to an operator; conductors extending from said solenoid-operated valves on said bracket to said pendant; and switches within said pendant adapted to control the energization of said solenoid-operated valves, thereby controlling the operation of said horizontal boring mill.

41. A machine tool headstock comprising in combination, an input shaft; a back shaft parallel with and geared to said input shaft; an intermediate shaft coaxial with said input shaft; six gears journaled on said back shaft in meshing relation with six gears fixed to said intermediate shaft, each of said six meshing gear arrangements providing a different gear ratio; clutches between the first and second gears, the third and fourth gears, and the fifth and sixth gears on said back shaft for selectively connecting any of said six gears to said back shaft; an output shaft parallel with said intermediate shaft; four gears journaled on said output shaft and in meshing relation with corresponding gears fixed to said intermediate shaft; and clutches between the first and second, and between the third and fourth gears on said output shaft; clutch-shifting rods attached to each of said shiftable clutches within said headstock and arranged in parallel relation; a bracket attached to said headstock and adapted to support a plurality of fluid-operated piston mechanisms for actuating said clutch-shifting rods; solenoid valves mounted on said bracket and adapted to control the flow of fluid to said fluid-operated piston mechanisms; a pendant adapted to be located in convenient access to an operator; conductors extending from said pendant to said solenoid valves; and switches within said pendant adapted to control the energization of said solenoid valves to thereby control the operation of said headstock.

42. In a horizontal boring mill, a base; a column attached to said base; a head mounted on said column for vertical reciprocation therealong; a spindle in said head adapted to be rotated and to be axially fed at a feed rate as well as at a relatively rapid traverse rate; a headstock located within said column comprising an input shaft; a back shaft parallel with and geared to said input shaft; an intermediate shaft coaxial with said input shaft; an output shaft parallel with said intermediate shaft; intermeshing gears between said back shaft, intermediate shaft and output shaft; positive action clutches between certain of the gears on said back shaft and said output shaft; a vertically-disposed shaft linked to said output shaft and extending vertically upwardly into said head; a high- and low-speed gearing arrangement within said head and connected to said spindle and adapted to be supplied with power by said vertically-disposed shaft; clutch-shifting rods arranged in parallel relation within said headstock; a bracket attached to said headstock and adapted to support fluid-operated piston and cylinder mechanisms for each of said clutch-shifting rods; a clutch-shifting rod within said head for actuating said high- and low-speed gearing arrangement therein; fluid-operated means for actuating said clutch-shifting rods within said head; solenoid-operated valves mounted on said bracket as well as on said head for controlling the respective fluid-operated piston and cylinder mechanisms; a pendant located in convenient access to an operator; conductors extending between said solenoid valves and said pendant; and switches within said pendant adapted to control the energization of said solenoid valves.

References Cited in the file of this patent

UNITED STATES PATENTS

| | | |
|---|---|---|
| 1,284,894 | Hill | Nov. 12, 1918 |
| 1,302,395 | McCarty | Apr. 29, 1919 |
| 2,251,015 | Gallimore | July 29, 1941 |
| 2,310,878 | Stephan | Feb. 9, 1943 |
| 2,426,621 | Kraut et al. | Sept. 2, 1947 |
| 2,428,309 | Gallimore | Sept. 30, 1947 |
| 2,610,520 | Snow | Sept. 16, 1952 |
| 2,677,284 | Berthiez | May 4, 1954 |